(12) United States Patent
Schaefer et al.

(10) Patent No.: US 10,472,539 B2
(45) Date of Patent: Nov. 12, 2019

(54) ONE-COMPONENT AMINO RESIN COATING COMPOSITIONS

(71) Applicant: BASF SE, Ludwigshafen (DE)

(72) Inventors: Harald Schaefer, Mannheim (DE); David Tuerp, Mannheim (DE); Daniel Flojhar, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 204 days.

(21) Appl. No.: 15/515,051

(22) PCT Filed: Aug. 6, 2015

(86) PCT No.: PCT/EP2015/068125
§ 371 (c)(1),
(2) Date: Mar. 28, 2017

(87) PCT Pub. No.: WO2016/050396
PCT Pub. Date: Apr. 7, 2016

(65) Prior Publication Data
US 2019/0016915 A1    Jan. 17, 2019

(30) Foreign Application Priority Data
Sep. 29, 2014 (EP) .................................... 14186902

(51) Int. Cl.
| | |
|---|---|
| C08G 63/40 | (2006.01) |
| C09D 167/02 | (2006.01) |
| C08G 12/42 | (2006.01) |
| C09D 161/24 | (2006.01) |
| C09D 161/26 | (2006.01) |
| C09D 161/28 | (2006.01) |
| C09D 161/32 | (2006.01) |
| C09D 167/08 | (2006.01) |
| C09D 169/00 | (2006.01) |
| C09D 133/08 | (2006.01) |
| C08G 63/137 | (2006.01) |

(52) U.S. Cl.
CPC ......... *C09D 167/02* (2013.01); *C08G 12/427* (2013.01); *C08G 63/40* (2013.01); *C09D 133/08* (2013.01); *C09D 161/24* (2013.01); *C09D 161/26* (2013.01); *C09D 161/28* (2013.01); *C09D 161/32* (2013.01); *C09D 167/08* (2013.01); *C09D 169/00* (2013.01); *C08G 63/137* (2013.01); *C08L 2205/02* (2013.01); *C08L 2205/03* (2013.01)

(58) Field of Classification Search
CPC .................................................. C08G 63/137
See application file for complete search history.

(56) References Cited

U.S. PATENT DOCUMENTS

| | | | |
|---|---|---|---|
| 5,552,184 A | 9/1996 | Klostermann et al. | |
| 6,646,049 B2 | 11/2003 | Ramesh | |
| 2004/0170767 A1* | 9/2004 | Flosbach ............ | C08G 18/4233 427/385.5 |
| 2008/0138527 A1 | 6/2008 | Okuma et al. | |
| 2011/0195262 A1 | 8/2011 | Adachi | |
| 2012/0183796 A1 | 7/2012 | Fukuda et al. | |

FOREIGN PATENT DOCUMENTS

| | | |
|---|---|---|
| DE | 42 04 611 A1 | 8/1993 |
| DE | 195 25 375 A1 | 1/1997 |
| DE | 196 51 350 A1 | 6/1998 |
| EP | 0 705 858 A2 | 4/1996 |
| JP | 2004-26940 A | 1/2004 |
| JP | 2009-091571 A | 4/2009 |
| WO | 01/46296 A1 | 6/2001 |
| WO | 2008/148555 A1 | 12/2008 |

OTHER PUBLICATIONS

U.S. Appl. No. 14/654,734, filed Jun. 22, 2015, US 2015-0322289 A1, Harald Schaefer, et al.
U.S. Appl. No. 15/125,338, filed Sep. 12, 2016, Harald Schaefer.
International Search Report dated Oct. 12, 2015 in PCT/EP2015/068125 Filed Aug. 6, 2015.
Extended European Search Report dated Mar. 20, 2015 in Patent Application No. 14186902.4 (with Translation of Categories of Cited Documents).
International Preliminary Report on Patentability and Written Opinion dated Apr. 13, 2017 in PCT/EP2015/068125 (with English language translation).
International Search Report (English language translation previously filed) and Written Opinion dated Oct. 12, 2015 in PCT/EP2015/068125 (with partial English language translation).
Notice of Reasons for Refusal dated Jul. 8, 2019, in Japanese Patent Application No. 2017-517020 filed Aug. 6, 2015 (with English translation).

* cited by examiner

*Primary Examiner* — Michael F Pepitone
(74) *Attorney, Agent, or Firm* — Oblon, McClelland, Maier & Neustadt, L.L.P.

(57) ABSTRACT

The present invention relates to one-component amino resin coating compositions having good chemical resistance, a good balance of hardness to elasticity, and rapid drying, to their use, and to methods for coating. Synthesis components that the coating compositions comprise include amino resin, hydroxyl-containing polymers as principal polyols, and certain branched polyester polyols, obtainable by polycondensation of hexahydrophthalic anhydride, trimethylolpropane, and optionally further components.

18 Claims, No Drawings

ONE-COMPONENT AMINO RESIN COATING COMPOSITIONS

CROSS-REFERENCE TO RELATED APPLICATIONS

The present application is a U.S. National Stage Entry of PCT/EP2015/068125, which was filed on Aug. 8, 2015, and which claims priority to EP 14186902.4, which was filed on Aug. 14, 2015 and has a priority date of Sep. 29, 2014.

The present invention relates to one-component amino resin coating compositions having good chemical resistance, a good balance of hardness to elasticity, and rapid drying, to their use, and to methods for coating. Synthesis components that the coating compositions comprise include amino resins, hydroxyl-containing polymers as principal polyols, and certain branched polyester polyols, obtainable by polycondensation of hexahydrophthalic anhydride, trimethylolpropane, and optionally further components.

One-component amino resin coating compositions are widespread for example in finishing within the automobile industry, for can coating and coil coating. Exacting requirements imposed on such coating systems include those relating to resistance and flexibility. For processing in the context of the coating, rapid drying is essential, since it enables accelerated further processing of the coated substrates, and/or allows energy savings to be made in the context of drying.

One-component amino resin coating compositions which comprise as binder a combination of—among others—amino resin, polyols (polyesterol, polyetherol, polyacrylateol), and hyperbranched polyesterols, are known from U.S. Pat. No. 6,646,049. The hyperbranched polyesterols are prepared in three steps: a core (e.g., trimetholopropane) is reacted in a first chain extension with a polyhydroxycarboxylic acid (dimethylolpropionic acid is standard) to form a polyol, in a second chain extension with a polycarboxylic acid (anhydride) (for example, hexahydrophthalic anhydride), (admixed with solvent), and in a third chain extension with an epoxide (e.g., Cardura® E-10 glycidyl ester) (cf. Example 1). The three-step procedure is very costly and inconvenient. Moreover, it has been necessary to add solvent inbetween, in order to achieve a sufficiently low viscosity for further reaction. Operations have been carried out using sulfuric acid as catalyst, this acid remaining free after the preparation, with possible adverse consequences, in a subsequent coating application, in relation to stability of the coating material and corrosion with respect to metallic substrates. The adducts of core polyol and polyhydroxycarboxylic acid have a very high degree of branching, with a highly dendritic structure. The hyperbranched polyesterols have external and embedded hydroxyl functions, of which the latter are unavailable, or inadequately available, for reaction. The reaction with the epoxide produces secondary alcohols, which possess a reduced reactivity by comparison with primary alcohols. In structural terms, internal and secondary hydroxyl groups inherently have a negative effect on the crosslinking density (chemical resistance) and curing. WO 01/46296 describes similarly synthesized hyperbranched polyesterols. WO 08/148555 describes clearcoat compositions based on the hyperbranched polyester polyols Boltorn® H30 and Boltorn® H20 through reaction with C8 and C9 monocarboxylic acids. The Boltorn® grades are poly(dimethylolpropionic acid) having a trimethylolpropane core, very high functionalities of 32 and 16, hydroxyl numbers of about 500 mg KOH/g, and high viscosities of 40 and 6 Pa*s at 110° C. For coating applications, these grades have very high hydroxyl numbers, are highly polar, and therefore exhibit low levels of compatibility with other coating components such as polyisocyanates and other polyols. In WO 08/148555, accordingly, they are hydrophobized by the C8 and C9 monocarboxylic acids, and the hydroxyl numbers are reduced. The raw materials base for the C8 and C9 monocarboxylic acids-modified poly(dimethylolpropionic acid) is very limited. The structure of the Boltorn® grades has a highly dendritic nature with individual layers of branching and, in analogy to U.S. Pat. No. 6,646,049, with internal hydroxyl groups that are not available for reaction in the coating material. Owing to the high viscosity of the Boltorn® grades, their reaction with the monocarboxylic acids takes place at 200° C. (example 1) in solvent, this being a disadvantage in safety terms. The Boltorn® grades and the polyesterols of the invention are prepared in two separate plants. In terms of the composition, the acid numbers are close to zero (≤6 mg KOH/g).

DE 4204611 describes coating materials comprising one or more polyester resins and also one or more amino resins and/or blocked di- and/or polyisocyanates, such materials characteristically comprising 45-85 wt % of one or more polyesterols, which are of branched construction and are substantially free from aromatic structural units, 10-40 wt % of one or more crosslinkers based on amino resins and/or blocked di- and/or polyisocyanates, 0-20 wt % of one or more reactive diluents, and 0-10 wt % of one or more organic solvents. Acid numbers are preferably 12-20 mg KOH/g. DE 4204611 describes for example (Ex. 1) a polyesterol consisting of 287 g of neopentyl glycol, 57 g of ethylene glycol, 134 g of trimethylolpropane, 197 g of adipic acid, and 324 g of hexahydrophthalic anhydride, which are reacted with 1 g of hypophosphorous acid as catalyst at 170° C. to 250° C. To this are added, at 70° C., 225.5 g of hexamethoxymethylmelamine (HMMM amino resin, fully methylated) and the reaction mixture is diluted with solvent (Texanol®). This mixture is admixed with small amounts of polycaprolactone triol as reactive diluent and with further diluent compounds of low molecular mass (triethylene glycol and also diesters of phthalic acid and 2-ethylhexanol), with blocked p-toluenesulfonic acid as catalyst, and with additives, and the mixture is cured to a clearcoat. The reaction of the raw materials to give the branched polyesterol takes place at high temperature and with catalysis, in order to convert the adipic acid. The individual components are mixed in situ and reacted. The trifunctional polycaprolactone triol added as secondary polyol, at 20% based on the polyesterol, is employed as reactive diluent for lowering the solids fraction. There is no reference to improving coating film properties.

EP 0705858 describes polyester polyols and the use thereof as a polyol component in two-component polyurethane coating materials. The polyester polyols are synthesized from neopentyl glycol (5-50%), trimethylolpropane (10-45%), and hexahydrophthalic anhydride (40-52%), in a specific mixing ratio, and have relatively low acid numbers of 5 to 30. A potential utilization of the polyester polyols for one-component systems is not described.

A particular object of the present invention was to provide one-component amino resin coating compositions which relative to other one-component coating compositions exhibit good chemical resistance, a good balance of hardness to elasticity, and rapid drying.

The object has been achieved by means of one-component amino resin coating compositions comprising as synthesis components (A) at least one amino resin, selected from the group consisting of melamine-formaldehyde resin, benzoguanamine-formaldehyde resin, and urea-formaldehyde resin,
(B) at least one hydroxyl-containing polymer selected from the group consisting of poly(meth)acrylate polyols (B1), polyester polyols (B2), polyetherols (B3), alkyd resins (B4), and polycarbonate polyols (B5),
(C) at least one branched polyester polyol, obtainable by polycondensation of
hexahydrophthalic anhydride,
trimethylolpropane,
optionally at least one diol,
optionally at least one further triol,
optionally at least one further diacid or triacid or derivatives thereof,
the acid groups and hydroxyl groups of the raw materials for the polyester polyol being used in a molar mixing ratio of 1:1 to 1:1.95, preferably of 1:1.2 to 1:1.8, and
there being used in the polyester polyol less than 20%, preferably less than 10%, more preferably no tetraalcohol stoichiometrically relative to hexahydrophthalic anhydride, and
the polyester polyol not being formed from dihydroxycarboxylic acids, and preferably not from polyhydroxycarboxylic acids either, especially not from dimethylolpropionic acid,
(D) optionally at least one chemical crosslinker, selected from the group consisting of blocked polyisocynates, trisalkylcarbamoyltriazines, epoxy resins, carboxyl-containing resins, and amino-containing resins other than amino resin (A),
(E) optionally at least one organic solvent,
(F) optionally at least one catalyst,
(G) optionally at least one typical coatings additive,
(H) optionally at least one filler, dye and/or pigment,
the ratio of components (B) to (C) being greater than 1:1 based on solids.

Relative to comparable one-component amino resin coating compositions, the coating compositions of the invention display good chemical resistance, a good balance of hardness to elasticity, and rapid drying.

One-component amino resin coating compositions of the invention consist of at least one amino resin, one hydroxyl-containing principal polymer, and one branched polyester polyol, and optionally further components.

The designation "(meth)acryl . . . " and similar designations are an abbreviated form of "acryl . . . or methacryl . . . ".

Component (A) comprises at least one amino resin.

The resins involved are, more particularly, melamine-formaldehyde resins, examples being unplasticized melamine-formaldehyde resins. Unplasticized melamine-formaldehyde resins serve as a crosslinking component in binder mixtures, either on their own or in combination with further, chemically different crosslinkers, examples being blocked polyisocyanates, trisalkylcarbamoyltriazines (TACT), or epoxies. Curing of the film-forming constituents gives a coating resistant to chemical, mechanical, and weathering-induced influences. Plasticized melamine-formaldehyde resins may feature modifications with carbamate structures, blends with polyesterols or alkyd resins and/or precondensation therewith. If used on flexible coating substrates lacking dimensional stability, unplasticized melamine-formaldehyde resins require preferably an external elasticization, so that the coating does not rupture. The crosslinker as a sole formulation constituent generally only forms brittle networks.

Suitable melamine-formaldehyde resins can be characterized according to fields of application (e.g., molding compounds, glues, impregnating resins, coating materials), etherifying alcohols (e.g., etherification with butanol, methanol, mixed etherification) or, as here, according to the ratio of triazine:formaldehyde:etherifying alcohol:
(1) completely to highly methylolated and fully alkylated to highly alkylated resins (HMMM grades)
(2) partly methylolated and highly alkylated resins (high imino grades)
(3) partly methylolated and partly alkylated resins (methylol grades)
(4) resins with a low degree of methylolation (melamine-formaldehyde condensates)

The first major group, that of the completely to highly methylolated and fully alkylated to highly alkylated (etherified) melamine-formaldehyde resins, in which the molar melamine:formal-dehyde:alcohol incorporation ratio is theoretically 1:6:6, preferably 1:greater than 5.5:greater than 5.0, and more preferably 1:greater than 5.5:greater than 4.5, are distinguished by extremely good high-solids behavior (relatively low viscosity at high solids content). In this group of crosslinkers, the free formaldehyde level is easy to reduce, owing to the low viscosity of the amino resin. As an example, it is possible to achieve a free formaldehyde content of less than 0.3 wt %. The commercial products usually comprise methanol as the alcohol, although grades with mixed etherification, or completely butylated grades, are also known. The etherified melamine-formaldehyde resins are employed preferably in can coatings and coil coatings, and for all coats of the automobile finish.

The low thermal reactivity under baking conditions, such as 20 minutes at 140° C., generally necessitates catalysis with strong acids for these completely etherified melamine-formaldehyde resins. This results in very rapid curing as a result of transetherification with the binder, with release of the etherifying alcohols, and in a homogeneous co-network. With this strong-acid catalysis, very short cure times are possible, as with partly methylolated melamine-formaldehyde resins. Crosslinking may be accompanied by a formaldehyde emission which goes well beyond the free formaldehyde and is due to the redissociation of methylol groups. Acid-catalyzed systems for can and coil applications are baked preferably in the range from 10 seconds to 10 minutes at 170 to 300° C.

The second major group, that of the partly etherified melamine-formaldehyde resins, preferably has a molar melamine:formaldehyde:alcohol incorporation ratio of 1:3 to 5.4:1.5 to 4.3 and is distinguished by a much higher thermal reactivity by comparison with the first group, without acid catalysis. The production of these crosslinkers is accompanied by self-condensation, which leads to a higher viscosity (lower high-solids behavior) and which consequently makes it more difficult to remove the free formaldehyde on distillation. For these products, a free formaldehyde content of 0.5% to 1.5% or of 0.3 to 3 wt % is preferred. Here again, methylated, butylated, and also mixedly etherified grades are widespread as commercial products. Etherification with other alkylating substances has been described in the literature and/or is available in the form of specialty products.

High-imino grades and methylol grades, each as a subgroup, both feature incomplete methylolation, i.e., molar formaldehyde incorporation ratios of less than 1:5.5. The high-imino grades differ from the methylol grades, however, in a high degree of alkylation, i.e., the fraction of etherified methylol groups as a proportion of the formaldehyde equivalents incorporated, of usually up to 80%, whereas the figure for the methylol grades is generally less than 70%.

Fields of use for the partly methylolated melamine-formaldehyde resins extend across all fields of use, including combinations with HMMM grades, for adaptation of reactivity, where curing temperatures of around 100 to 150° C. are called for. Additional catalysis using weak acids is possible. Besides the reaction of the amino resin with the binder, there is a significantly increased fraction of self-crosslinking on the part of the crosslinker. The consequence is a reduced elasticity in the system as a whole, which can be compensated by appropriate selection of the co-component. An advantageous feature is the reduced total formaldehyde emissions from the coatings produced from the resins.

As well as amino resins, especially melamine-formaldehyde resins, with only one etherifying alcohol, products with mixed etherification can also be used. In that case a melamine-formaldehyde resin is etherified with more than one alcohol, selected for example from methanol, ethanol, n-butanol, isobutanol and/or 2-ethylhexanol, especially, for example, methanol/n-butanol.

Another group of amino resins, whose construction and properties are very similar to those of the melamine-formaldehyde resins, are the benzoguanamine resins (benzoguanamine/form-aldehyde resins). Free OH groups may also be at least partly etherified with lower alcohols, particularly C1-C4 alcohols, more preferably methanol or n-butanol.

Other amino resins include, for example, urea resins, in other words polycondensation products of urea and formaldehyde (abbreviated code UF, 5 according to DIN EN ISO 1043-1: 2002-6). Free OH groups may also be at least partly etherified with lower alcohols, particularly C1-C4 alcohols, more preferably methanol or n-butanol.

The melamine-formaldehyde resin used may comprise or be mixed with at least one solvent. Examples of such solvents are alcohols, aromatic and/or (cyclo)aliphatic hydrocarbons and mixtures thereof, esters, ethers, carbonates, and halogenated hydrocarbons. Preference is given to alkyl alcohols, such as, for example, methanol, ethanol, isopropanol, n-propanol, n-butanol, isobutanol, or 2-ethylhexanol, or aromatic hydrocarbons, such as toluene or xylene isomer mixtures, for example. Particularly preferred are methanol, ethanol, n-butanol, isobutanol, 2-ethylhexanol, xylene, and mixtures thereof, more particularly n-butanol/xylene or methanol/ethanol. Examples of esters are n-butyl acetate, ethyl acetate, 1-methoxyprop-2-yl acetate, and 2-methoxyethyl acetate, and also the mono- and diacetyl esters of ethylene glycol, diethylene glycol, triethylene glycol, propylene glycol, dipropylene glycol, or tripropylene glycol, such as butyl glycol acetate, for example. Other examples are also carbonates, such as preferably 1,2-ethylene carbonate, 1,2-propylene carbonate, or 1,3-propylene carbonate. Examples of ethers are tetrahydrofuran (THF), dioxane, and also the dimethyl ether, diethyl ether, or di-n-butyl ether of ethylene glycol, diethylene glycol, triethylene glycol, propylene glycol, dipropylene glycol, or tripropylene glycol. Water is additionally suitable.

Component (B) comprises one or more polymeric polyols which comprise groups that are reactive toward melamine-formaldehyde resins. More particularly these polyols are poly (meth)acrylate polyols (B1), polyesterols (B2), polyetherols (B3), alkyd resins (B4), or polycarbonate polyols (B5).

The hydroxyl-containing polymers (B) have on average per molecule at least two, preferably two to ten, more preferably three to ten, and very preferably three to eight hydroxyl groups.

The determination of hydroxyl numbers is based on DIN 53240-2:2007-11. The acid number is taken into account in the calculation. Acid numbers are determined according to DIN EN ISO 2114:2000, method A.

The poly(meth)acrylate polyols (B1) are, for example, copolymers of (meth)acrylic esters with at least one compound having at least one, preferably precisely one, hydroxyl group and at least one, preferably precisely one, (meth)acrylate group. The hydroxyl-containing polymer (B) is preferably a poly(meth)acrylate polyol (B1) having a number-average molecular weight $M_n$ of 500 to 50 000 D, preferably of 800 to 5000 D, more preferably of 1000 to 2000 D.

The latter may be, for example, monoesters of α,β-unsaturated carboxylic acids, such as acrylic acid, methacrylic acid (identified for short in this specification as "(meth)acrylic acid"), with diols or polyols which have preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3-, or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, polyTHF having a number-average molar weight of between 162 and 2000, poly-1,3-propanediol or polypropylene glycol having a number-average molar weight of between 134 and 2000, or polyethylene glycol having a number-average molar weight of between 238 and 2000.

Preference is given to 2-hydroxyethyl acrylate, 2-hydroxyethyl methacrylate, 2-hydroxypropyl acrylate, 3-hydroxypropyl acrylate, 1,4-butanediol monoacrylate, or 3-(acryloyloxy)-2-hydroxypropyl acrylate, and particular preference to 2-hydroxyethyl acrylate and/or 2-hydroxyethyl methacrylate.

The hydroxyl-bearing monomers are preferably copolymerized in a mixture with other polymerizable comonomers, preferably radically polymerizable comonomers. Preferred mixtures are those consisting to an extent of more than 50 wt % of $C_1$-$C_{20}$ alkyl (meth)acrylate, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures thereof. Particularly preferred are the polymers (B1) which consist to an extent of more than 60 wt % of $C_1$-$C_{10}$ alkyl (meth)acrylates, styrene, or mixtures thereof. The poly (meth)acrylate polyols (B1) contain preferably 5 to 50 wt %, more particularly 10 to 40 wt %, of hydroxyl-bearing monomers. Furthermore, the hydroxyl-functional polymers may optionally comprise further monomers, examples being ethylenically unsaturated acids, especially carboxylic acids, acid anhydrides, or acid amides.

The following are examples contemplated as solvents for component (B1): aromatics, such as solvent naphtha, xylenes, toluene, esters such as ethyl acetate, butyl acetate, methyl glycol acetate, ethyl glycol acetate, butyl glycol acetate, methoxypropyl acetate, tert-butyl acetate, ethers such as butyl glycol, tetrahydrofuran, dioxane, ethyl glycol ether, ketones such as acetone, methyl ethyl ketone, methyl amyl ketone, methyl isobutyl ketone and/or alcohols such as n-butanol, isobutanol, butyl glycol, and aliphatic hydrocarbons. Preference is given to butyl acetate and xylene.

Further binders are polyesterols (B2), of the kind obtainable by condensation of polycarboxylic acids, especially dicarboxylic acids, with polyols, especially diols. Preferred are polyester polyols (polyesterols), i.e., polyesters having two or more hydroxyl groups.

Polyester polyols are known from, for example, Ullmanns Enzyklopädie der technischen Chemie, $4^{th}$ edition, volume 19, pp. 62 to 65. Preference is given to using polyester polyols which are obtained by reaction of dihydric alcohols with dibasic carboxylic acids. In lieu of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, araliphatic, aromatic, or heterocyclic and may optionally be substituted, by halogen atoms, for example, and/or unsaturated. Examples include the following: oxalic acid, maleic acid, fumaric acid, succinic acid, glutaric acid, adipic acid, sebacic acid, dodecanedioic acid, orthophthalic acid, isophthalic acid, terephthalic acid, trimellitic acid, azelaic acid, 1,4-cyclohexanedicarboxylic acid, or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, examples being $C_1$-$C_4$ alkyl esters, preferably methyl, ethyl, or n-butyl esters, of the stated acids. Preferred dicarboxylic acids are those of the general formula $HOOC—(CH_2)_y—COOH$, where y is a number from 1 to 20, preferably an even number from 2 to 20, particular preference being given to succinic acid, adipic acid, sebacic acid, and dodecanedicarboxylic acid.

Polyhydric alcohols contemplated for the preparation of the polyesterols are as follows: 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF having a number-average molar mass of between 162 and 2000, poly-1,3-propanediol having a number-average molar mass of between 134 and 1178, poly-1,2-propanediol having a number-average molar mass of between 134 and 898, polyethylene glycol having a number-average molar mass of between 106 and 458, neopentyl glycol, neopentyl glycol hydroxypivalate, 2-ethyl-1,3-propanediol, 2-methyl-1,3-propanediol, 2,2-bis(4-hydroxycyclohexyl)propane, 1,1-, 1,2-, 1,3-, and 1,4-cyclohexanedimethanol, 1,2-, 1,3-, and 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, or isomalt, which may optionally have been alkoxylated as described above. Preferred alcohols are those of the general formula $HO—(CH_2)_x—OH$, where x is a number from 1 to 20, preferably an even number from 2 to 20. Preference is given to ethylene glycol, butane-1,4-diol, hexane-1,6-diol, octane-1,8-diol and dodecane-1,12-diol. Additionally preferred is neopentyl glycol.

Solvents contemplated for component (B2) include in principle the same solvents as for component (B1). Preferred solvents for polyesterols are esters such as butyl acetate and tert-butyl acetate, and aromatics such as solvent naphtha, xylene, and toluene.

Also suitable are lactone-based polyester diols, these being homopolymers or copolymers of lactones, preferably hydroxyl-terminated adducts of lactones with suitable difunctional starter molecules. Lactones contemplated include preferably those which derive from compounds of the general formula $HO—(CH_2)_z—COOH$, where z is a number from 1 to 20 and one H atom of a methylene unit may also be replaced by a $C_1$- to $C_4$ alkyl radical. Examples are epsilon-caprolactone, β-propiolactone, gamma-butyrolactone and/or methyl-epsilon-caprolactone, 4-hydroxybenzoic acid, 6-hydroxy-2-naphthoic acid, or pivalolactone, and also mixtures thereof. Suitable starter components are, for example, the low molecular mass dihydric alcohols stated above as a synthesis component for the polyester polyols. The corresponding polymers of epsilon-caprolactone are particularly preferred. Lower polyester diols or polyether diols as well may be used as starters for preparing the lactone polymers. Instead of the polymers of lactones, it is also possible to use the corresponding, chemically equivalent polycondensates of the hydroxycarboxylic acids corresponding to the lactones.

Additionally suitable as hydroxyl-containing polymers (B) are also polyetherols (B3), which may be prepared, for example, by addition reaction of ethylene oxide, propylene oxide, or butylene oxide with H-active components. Also suitable are polycondensates of butanediol.

The hydroxyl-containing polymers may of course also be compounds having primary or secondary amino groups additional to the hydroxyl groups.

Alkyd resins (B4) are polycondensation resins of polyols, polybasic carboxylic acids, and fatty oils or free natural and/or synthetic fatty acids; at least one polyol must have a functionality of three or more. As polyols and polybasic carboxylic acids it is possible for example to use the components identified above for the polyesterols. Preferred polyhydric alcohols are glycerol, pentaerythritol, trimethylolethane, trimethylolpropane, various diols such as ethane-/propane-diol, diethylene glycol, neopentyl glycol. Preferred polybasic carboxylic acids are phthalic acid, phthalic anhydride (Pan), isophthalic acid, terephthalic acid, trimellitic anhydride, adipic acid, azelaic acid, and sebacic acid.

Examples of oil components or fatty acids contemplated, respectively, include drying oils, such as linseed oil, oiticica oil, or tung oil, semidrying oils, such as soybean oil, sunflower oil, safflower oil, ricinene oil, or tall oil, nondrying oils, such as castor oil, coconut oil, or peanut oil, or free fatty acids of above oils, or synthetic monocarboxylic acids.

The number-average molar mass of typical alkyd resins is between 1500 and 20 000 D, preferably between 3500 and 6000 D. The acid number is preferably 2 to 30 mg KOH/g, or else 35-65 mg KOH/g in the case of water-dilutable resins. The OH number is generally up to 300, preferably up to 100 mg KOH/g.

Also contemplated, furthermore, are polycarbonate polyols (B5), of the kind obtainable, for example, by reaction of phosgene with an excess of the low molecular mass alcohols identified as synthesis components for the polyester polyols.

The branched polyesterol of component (C) is at least one, one to three for example, preferably one to two, and more preferably precisely one high-functionality, preferably highly branched or hyperbranched, polyester polyol. The number-average molecular weight Mn is preferably at least 500, more preferably at least 700. The upper limit to the molecular weight $M_n$ is preferably 30 000 g/mol, more preferably 10 000 g/mol, very preferably 4000 g/mol. In one preferred embodiment the molecular weight $M_n$ is from 500 to 4000, more particularly from 700 to 2500, more particularly from 950 to 2000 g/mol. The polydispersity $M_w/M_n$ is preferably 1.1-50, more preferably less than or equal to 5, more particularly less than 3.5.

The branched polyester polyols of component (C) are obtainable by polycondensing
hexahydrophthalic anhydride,
trimethylolpropane,
optionally at least one diol,
optionally at least one further triol,
optionally at least one further diacid or triacid or derivatives thereof.

Based on acid groups and hydroxyl groups, the acids and polyols of the polyester polyol (C) are used in a molar mixing ratio of 1:1 to 1:1.95, preferably of 1:1.1 to 1:1.8 or of 1:1.2 to 1:1.8. In one embodiment they are used preferably in a molar mixing ratio of 1:1.15 to 1:1.6 or of 1.2 to 1.6. The polyester polyol (C) is preferably prepared exclusively from hexahydrophthalic anhydride and trimethylolpropane in a molar mixing ratio of acid groups to hydroxyl groups of 1:1.1 to 1:1.6.

The polyester polyols (C) preferably possess a sum total of acid number according to DIN EN ISO 2114:2000 and hydroxyl number according to DIN 53240-2:2007-11 of 200 to 400, preferably 250 to 400 mg KOH/g. The OH number is preferably 130 to 280 mg KOH/g. The acid number is preferably from 8 to 110 mg KOH/g. In specific variations, the acid number is preferably greater than or equal to 33 mg KOH/g, as for example from 33 to 100 mg KOH/g, or greater than or equal to 40, more particularly 70 to 100 mg KOH/g, based on solids.

The polyester polyols (C) preferably have a glass transition temperature of −60 to 100° C., of −50 to 90° C., and more preferably of −40 to 80° C., of −20 to 50° C., or of −15 to 50° C. The glass transition temperature is measured according to ASTM protocol D3418-03 via differential scanning calorimetry (DSC), with a heating rate of 10° C./min.

The polyester polyols (C) typically have good solubility, i.e., it is possible to prepare solutions which are clear at 25° C. and contain up to 50 wt %, in certain cases even up to 80 wt %, of the polyester polyols of the invention in tetrahydrofuran (THF), ethyl acetate, n-butyl acetate, alcohols such as, for example, methanol, ethanol, butanol, and isobutanol, and other solvents, without gel particles being detectable with the naked eye.

The optional dicarboxylic acids include for example aliphatic dicarboxylic acids, such as oxalic acid, malonic acid, succinic acid, glutaric acid, adipic acid, pimelinic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid. It is also possible additionally to use aromatic dicarboxylic acids, such as phthalic acid, isophthalic acid or terephthalic acid, for example. Unsaturated dicarboxylic acids as well, such as maleic acid or fumaric acid, can be used, albeit less preferably.

Said dicarboxylic acids may also be substituted by one or more radicals selected from:

$C_1$-$C_{20}$ alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, trimethylpentyl, n-nonyl, n-decyl, n-dodecyl, n-octadecyl and n-eicosyl, for example; $C_3$-$C_{12}$ cycloalkyl groups, such as cyclopropyl, cyclobutyl, cyclopentyl, cyclohexyl, cycloheptyl, cyclooctyl, cyclononyl, cyclodecyl, cycloundecyl and cydododecyl, for example; preference is given to cyclopentyl, cyclohexyl and cycloheptyl; alkylene groups such as methylene or ethylidene; or $C_6$-$C_{14}$ aryl groups such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, for example, preferably phenyl, 1-naphthyl and 2-naphthyl, more preferably phenyl. Exemplary representatives of substituted dicarboxylic acids that may be mentioned include the following: 2-methyl-malonic acid, 2-ethylmalonic acid, 2-phenylmalonic acid, 2-methylsuccinic acid, 2-octadecenylsuccinic acid and its anhydride (see below), 2-ethylsuccinic acid, 2-phenylsuccinic acid, itaconic acid, 3,3-dimethylglutaric acid. It is also possible to use mixtures of two or more of the aforementioned dicarboxylic acids.

The dicarboxylic acids can be used either as such or in the form of derivatives.

By derivatives are meant preferably
the relevant anhydrides in monomeric or else polymeric form,
monoalkyl or dialkyl esters, preferably mono- or di-$C_1$-$C_4$ alkyl esters, more preferably monomethyl or dimethyl esters or the corresponding monoethyl or diethyl esters, additionally monovinyl and divinyl esters, and also
mixed esters, preferably mixed esters with different $C_1$-$C_4$ alkyl components, more preferably mixed methyl ethyl esters.

$C_1$-$C_4$ alkyl for the purposes of this specification means methyl, ethyl, isopropyl, n-propyl, n-butyl, isobutyl, sec-butyl and tert-butyl, preferably methyl, ethyl and n-butyl, more preferably methyl and ethyl and very preferably methyl.

It is also possible to use a mixture of a dicarboxylic acid and one or more of its derivatives. It is likewise possible within the context of the present invention to use a mixture of two or more different derivatives of one or more dicarboxylic acids. Optional dicarboxylic acids are, in particular, malonic acid, sebacic acid, succinic acid, glutaric acid, adipic acid, 1,2-, 1,3- or 1,4-cyclohexanedicarboxylic acid (hexahydrophthalic acids), phthalic acid, isophthalic acid, terephthalic acid or the monoalkyl or dialkyl esters thereof. A preferred diacid derivative is dimethyl adipate.

In one embodiment of the invention the branched polyester polyol (C) is prepared not using any further diacid (apart from hexahydrophthalic anhydride) or derivatives thereof or triacids or derivatives thereof.

Optional tricarboxylic acids or polycarboxylic acids ($A_x$) are for example aconitic acid, 1,3,5-cyclohexanetricarboxylic acid, 1,2,4-benzenetricarboxylic acid, 1,3,5-benzenetricarboxylic acid, 1,2,4,5-benzenetetracarboxylic acid (pyromellitic acid) and also mellitic acid and low molecular weight polyacrylic acids. The index "x" here stands for the functionality in terms of carboxyl groups represented by "A"; it is governed by x≥3, preferably x=3 or 4 and more preferably x=3. Tricarboxylic acids or polycarboxylic acids ($A_x$) can be used in the reaction according to the invention either as such or else in the form of derivatives.

By derivatives are meant preferably
the relevant anhydrides in monomeric or else polymeric form,
mono-, di- or trialkyl esters, preferably mono-, di- or tri-$C_1$-$C_4$ alkyl esters, more preferably mono-, di- or trimethyl esters or the corresponding mono-, di- or triethyl esters,
additionally mono-, di- and trivinyl esters, and also
mixed esters, preferably mixed esters having different $C_1$-$C_4$ alkyl components, more preferably mixed methyl ethyl esters.

Within the context of the present invention it is also possible to use a mixture of a tricarboxylic or polycarboxylic acid and one or more of its derivatives, such as a mixture of pyromellitic acid and pyromellitic dianhydride, for example. It is likewise possible within the context of the present invention to use a mixture of two or more different derivatives of one or more tricarboxylic or polycarboxylic acids, such as a mixture of 1,3,5-cyclohexanetricarboxylic acid and pyromellitic dianhydride, for example.

Optional further diols used in accordance with the present invention include for example ethylene glycol, propane-1,2-diol, propane-1,3-diol, 2-butyl-2-ethyl-1,3-propanediol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)-cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, n being an integer and n≥4, polyethylene-polypropylene glycols, the sequence of the ethylene oxide or propylene oxide units being blockwise or random, polytetramethylene glycols, preferably with a number-average molar weight of up to 5000 g/mol, poly-1,3-propanediols, preferably with a number-average molar weight up to 5000 g/mol, polycaprolactones, or mixtures of two or more representatives of the above compounds. Either one or both hydroxyl groups in the abovementioned diols may be replaced by SH groups. Diols whose use is preferred are ethylene glycol, 1,2-propanediol, 1,3-propanediol, 2-butyl-2-ethyl-1,3-propanediol, 1,4-butanediol, 1,5-pentanediol, neopentyl glycol, 1,6-hexanediol, 1,8-octanediol, 1,2-, 1,3- and 1,4-cyclohexanediol, 1,3- and 1,4-bis(hydroxymethyl)cyclohexane, and diethylene glycol, triethylene glycol, dipropylene glycol and tripropylene glycol.

Particularly preferred are isomers or isomer mixture of tricyclodecanedimethanol, (optionally alkyl-substituted) tetrahydro-2,5-bis(hydroxymethyl)furan, neopentyl glycol, 2-butyl-2-ethyl-1,3-propanediol, and 1,6-hexanediol, very preferably neopentyl glycol and 2-butyl-2-ethyl-1,3-propanediol. In one embodiment the polyester polyol (C) is formed exclusively from hexahydrophthalic anhydride, trimethylolpropane, and diols selected from the group consisting of the isomers or isomer mixtures of tricyclodecanedimethanol, tetrahydro-2,5-bis(hydroxymethyl)furan, 1,6-hexanediol, neopentyl glycol, and 2-butyl-2-ethyl-1,3-propanediol. With particular preference the polyester polyol (C) is formed exclusively from hexahydrophthalic anhydride, trimethylolpropane, and neopentyl glycol.

The molar mixing ratio of hydroxyl groups of the trimethylolpropane to the hydroxyl groups of the sum total of all diols is preferably above 1:1, more preferably 1.1:1 to 3:1.

Optional alcohols with a functionality of at least three ($B_y$) encompass glycerol, trimethylolmethane, trimethylolethane, 1,2,4-butanetriol, tris(hydroxymethyl)amine, tris(hydroxyethyl)amine, tris(hydroxypropyl)amine, pentaerythritol, diglycerol, triglycerol or higher condensates of glycerol, di(trimethylolpropane), di(pentaerythritol), trishydroxymethyl isocyanurate, tris(hydroxyethyl) isocyanurate (THEIC), tris(hydroxypropyl) isocyanurate, inositols or sugars, such as glucose, fructose or sucrose, for example, sugar alcohols such as sorbitol, mannitol, threitol, erythritol, adonitol (ribitol), arabitol (lyxitol), xylitol, dulcitol (galactitol), maltitol, isomalt, polyetherols with a functionality of three or more, based on alcohols with a functionality of three or more and on ethylene oxide, propylene oxide and/or butylene oxide. Particular preference is given here to glycerol, diglycerol, triglycerol, trimethylolethane, ditrimethylolpropane, 1,2,4-butanetriol, pentaerythritol, tris(hydroxyethyl) isocyanurate and also polyetherols thereof based on ethylene oxide and/or propylene oxide. Very particular preference is given to glycerol, ditrimethylolpropane and pentaerythritol. The index "y" here stands for the functionality in terms of hydroxyl groups represented by "B"; it is governed by y≥3, preferably y=3 or 4 and more preferably y=3.

Stoichiometrically, based on hexahydrophthalic anhydride, the polyester polyol comprises less than 20%, preferably less than 10%, more preferably no tetrafunctional alcohol. A higher fraction of tetrafunctional alcohols leads to gelling of the resultant polyester polyol even at relatively low conversions. In addition to the risk of gelling as such, an attempt is made to avoid it by means of a lower conversion. That in turn then leads to a higher residual monomer content. This is undesirable and may possibly have adverse consequences, as a plasticizer in coating materials, for example. Tetraalcohols, moreover, have a high polarity, especially pentaerythritol. This in turn raises the incompatibility of the polyester polyol (C) with other film-forming components such as the poly(meth)acrylate polyols (B1).

The branched polyester polyols (C) may be prepared in bulk or in the presence of a solvent. In one preferred embodiment the reaction is carried out free of solvent and the polyester polyol can be subsequently dissolved in solvent.

To carry out the process it is possible to operate in the presence of a water remover agent, as an additive added at the beginning of the reaction. Suitable examples include molecular sieves, especially molecular sieve 4 Å, $MgSO_4$ and $Na_2SO_4$. It is also possible during the reaction to add further water remover or to replace water remover by fresh water remover. It is also possible to remove water and/or alcohol, formed during the reaction, by distillation and, for example, to use a water separator, in which case the water is removed with the aid of an azeotrope former.

Separation may also take place by stripping: for example, by passing a gas which is inert under the reaction conditions through the reaction mixture, additionally, if desired, to a distillation. Suitable inert gases include preferably nitrogen, noble gases, carbon dioxide or combustion gases.

The separation may additionally take place under reduced pressure.

The polyester polyol (C) is preferably prepared in the absence of catalysts, more particularly in the absence of organometallic catalysts, more particularly without tin catalyst, so that the polyester polyol (C) is tin-free. If catalysts are used, this takes place preferably with an (organometallic) zinc, titanium, zirconium, bismuth, or aluminum catalyst or with another catalyst that does not comprise tin, as for example an acidic inorganic or an acidic organic catalyst or mixture thereof, preferably with a catalyst comprising titanium.

Acidic inorganic catalysts are for example sulfuric acid, sulfates and hydrogensulfates, such as sodium hydrogensulfate, phosphoric acid, phosphonic acid, hypophosphorous acid, aluminum sulfate hydrate, alum, acidic silica gel (pH≤6, especially ≤5) and acidic aluminum oxide. Further acidic inorganic catalysts which can be used include, for example, aluminum compounds of the general formula $Al(OR^3)_3$ and titanates of the general formula $Ti(OR^3)_4$, it being possible for the radicals $R^3$ to be identical or different in each case and to be selected independently of one another from $C_1$-$C_{20}$ alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, iso-amyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl, for example; $C_3$-$C_{12}$ cycloalkyl radicals, such as cyclopropyl, cyclobutyl, cyclopentyl, cyclohexyl, cycloheptyl, cyclooctyl, cyclononyl, cyclodecyl, cycloundecyl and cydododecyl, for example; preferably cyclopentyl, cyclohexyl and cycloheptyl. The radicals $R^3$ in $Al(OR^3)_3$ and/or $Ti(OR^3)_4$ are identical in each case and are selected from n-butyl, isopropyl or 2-ethylhexyl.

The polyester polyol (C) is preferably prepared in a one-stage procedure.

The process for preparing the polyester polyol (C) is carried out preferably under an inert gas atmosphere, i.e., a gas which is inert under the reaction conditions, such as under carbon dioxide, combustion gases, nitrogen or noble gas, for example, among which argon may be mentioned in particular. The process is carried out at temperatures from 60 to 250° C. It is preferred to operate at temperatures from 150 to 200° C., more preferably at 160 to 180° C. The pressure conditions of the process of the invention are not generally critical. It is possible to operate at a significantly reduced pressure, such as at from 10 to 500 mbar, for example. The process can also be carried out at pressures above 500 mbar. Preference is given, on grounds of simplicity, to reaction at atmospheric pressure; also possible, however, is its implementation at a slightly elevated pressure, up to 1200 mbar for example. It is also possible to operate under significantly increased pressure, at pressures of up to 10 bar, for example. Reaction under reduced or atmospheric pressure is preferred, particular preference being given to atmospheric pressure. The reaction time of the process after heating to the reaction temperature is dependent on the raw materials and desired final product data, such as acid number (and hydroxyl number). It is typically 1 to 48 hours, preferably 2 to 26 hours. In the absence of dimethyl adipate, it may take, in one preferred form, 2 to 8 hours; when dimethyl adipate is used, the reaction may take, for example, 16 to 26 hours. Alternatively the reaction time can be shortened by means of higher temperatures.

In the presence of di-/triacids or their dialkyl esters, the reaction times may be significantly prolonged and/or reaction temperatures significantly increased in order to obtain the same conversion as in the absence of these building blocks. The absence of such building blocks may be of advantage in relation to the cost and complexity of preparation.

After the end of the reaction the high-functionality highly branched and hyperbranched polyester polyols can be isolated easily, optionally by filtering off the catalyst and stripping off the solvent if desired, in which case the stripping of the solvent is normally carried out under reduced pressure. Further highly suitable workup methods are precipitation of the polymer following addition of water and subsequent washing and drying. The process for preparing the polyester polyol (C) takes place preferably without catalyst and without solvent.

In one embodiment of the invention the polyester polyols of the invention may contain further functional groups in addition to the functional groups already obtained by virtue of the reaction. Subsequent functionalization is obtainable by reacting the resultant high-functionality highly branched or hyperbranched polyester polyol in an additional process step with a suitable functionalizing reagent which is able to react with the OH and/or carboxyl groups of the polyester polyol.

Functionalization of hydroxyl-containing polyester polyols of the invention with saturated or unsaturated, aliphatic, cycloaliphatic, araliphatic or aromatic monocarboxylic acids can preferably take place only subsequently, i.e., after the end of the actual reaction, in a separate step. Suitable saturated monocarboxylic acids may comprise 1 to 30 carbon atoms, preferably 2 to 30, more preferably 4 to 25, very preferably 6 to 20, and in particular 8 to 20 carbon atoms. Examples of suitable saturated monocarboxylic acids are formic acid, acetic acid, propionic acid, butyric acid, pivalic acid, caproic acid, 2-ethylhexanoic acid, octanoic acid, isononanoic acid, capric acid, undecanoic acid, lauric acid, myristic acid, pentadecanoic acid, palmitic acid, margaric acid, stearic acid, nonadecanoic acid, arachic acid, behenic acid, oleic acid, linoleic acid, linolenic acid, benzoic acid and α- or β-naphthoic acid. Monocarboxylic acids may be used in amounts up to 20% by weight, preferably up to a maximum of 15% by weight, based on hexahydrophthalic anhydride. Suitable α,β-unsaturated monocarboxylic acids can comprise 3 to 20 carbon atoms, preferably 3 to 10, more preferably 3 to 6, very preferably 3 to 5 and in particular 3 to 4 carbon atoms. Examples of suitable α,β-unsaturated monocarboxylic acids are acrylic acid, methacrylic acid, ethacrylic acid, α-chloroacrylic acid, maleic acid, fumaric acid, itaconic acid, crotonic acid, citraconic acid, mesaconic acid or glutaconic acid, preferably acrylic acid, methacrylic acid, maleic acid, fumaric acid, itaconic acid and crotonic acid, more preferably acrylic acid, methacrylic acid, maleic acid, fumaric acid and crotonic acid, very preferably acrylic acid and methacrylic acid and in particular acrylic acid. The reaction with saturated or unsaturated monocarboxylic acids can take place with, instead of the carboxylic acids, their derivatives too, for example with their anhydrides, chlorides or esters, preferably with their anhydrides or esters, more preferably with their esters with $C_1$-$C_4$ alkyl alcohols, and very preferably with their methyl esters.

Preferably there is no further functionalization.

The one-component amino resin coating composition may optionally be used in combination with further crosslinkers (D), chemically different from the other components, examples being blocked polyisocyanates, trisalkylcarbamoyltriazines (TACT), epoxides, and carboxyl- and amino-containing resins as a crosslinking component. The chemical crosslinkers may be used, depending on the type and system, in customary amounts known to the skilled person, as for example from 0 to 40 wt % or from 0.1 to 25 wt %, based on the solids content.

In the case of blocked polyisocyanates, examples of classes of compound that are used for the blocking are described in D. A. Wicks, Z. W. Wicks, Progress in Organic Coatings, 36, 148-172 (1999), 41, 1-83 (2001) and also 43, 131-140 (2001). Examples of classes of compound used for blocking are phenols, imidazoles, triazoles, pyrazoles, oximes, N-hydroxyimides, hydroxybenzoic esters, secondary amines, lactams, CH-acidic cyclic ketones, malonic esters, or alkyl acetoacetates. The polyisocyanates are selected from the group consisting of isocyanurates, iminooxadiazinediones, biurets, uretdiones, urethanes, and allophanates, preferably isocyanurates. In one preferred embodiment the polyisocyanate comprises polyisocyanates that comprise isocyanurate groups and that derive from 1,6-hexamethylene diisocyanate or 1-isocyanato-3,3,5-trimethyl-5-(isocyanatomethyl)cyclohexane (isophorone diisocyanate), more preferably from 1,6-hexamethylene diisocyanate.

The one-component amino resin coating composition may optionally further comprise solvents (E). Suitable solvents are those described above for components (B). Solvents (E) are used in the amino resin coating composition in an amount of preferably 0 to 80 wt %, more preferably of 20 to 70 wt %, more particularly 30 to 60 wt %.

The one-component amino resin coating composition may optionally comprise catalysts. The catalysts are preferably in the form of acids (F). Weak and medium-strength acids with catalyst suitability are understood in the context of this specification to be monobasic or polybasic, organic or inorganic, preferably organic, acids having a $pK_a$ of between 1.6 and 5.2, preferably between 1.6 and 3.8.

Examples of weak and medium-strength acids with catalyst suitability are carbonic acid, phosphoric acid, formic acid, acetic acid, and maleic acid, glyoxylic acid, bromoacetic acid, chloroacetic acid, thioglycolic acid, glycine, cyanoacetic acid, acrylic acid, malonic acid, hydroxypropanedioic acid, propionic acid, lactic acid, 3-hydroxypropionic acid, glyceric acid, alanine, sarcosine, fumaric acid, acetoacetic acid, succinic acid, isobutyric acid, pentanoic acid, ascorbic acid, citric acid, nitrilotriacetic acid, cyclopentanecarboxylic acid, 3-methylglutaric acid, adipic acid, hexanoic acid, benzoic acid, cyclohexanecarboxylic acid, heptanedione acid, heptanoic acid, phthalic acid, isophthalic acid, terephthalic acid, toluic acid, phenylacetic acid, phenoxyacetic acid, mandelic acid or sebacic acid. Preferred as catalyst are organic acids, preferably monobasic or polybasic carboxylic acids. Particularly preferred are formic acid, acetic acid, maleic acid, or fumaric acid. Examples of medium-strength acids are phosphoric acid and mono- and dialkyl-phosphoric acids.

Strong acids with catalyst suitability are understood in the context of this specification to be monobasic, organic or inorganic, preferably organic, acids having a $pK_a$ of less than 1.6 and more preferably less than 1. Examples thereof are sulfuric acid, pyrophosphoric acid, sulfurous acid, tetrafluoroboric acid, trichloroacetic acid, dichloroacetic acid, oxalic acid, nitroacetic acid. Organic acids are preferred, preferably organic sulfonic acids. Particularly preferred are methanesulfonic acid, para-toluenesulfonic acid, benzenesulfonic acid, dodecylbenzenesulfonic acid, cyclododecanesulfonic acid, and camphorsulfonic acid.

The acids with catalyst suitability are used in general in amounts of up to 10 wt %, preferably of 0.1 to 8, more preferably of 0.3 to 6, very preferably of 0.5 to 5, and more particularly of 1 to 3 wt %, based on the amino resin (A) used (solid on solid). The acids may be used as free acids or in blocked form. Preference is given to the use of medium-strength and strong acids, optionally blocked, phosphoric acids or sulfonic acids, more preferably of optionally blocked sulfonic acids.

The one-component amino resin coating composition may optionally comprise typical coatings additives (G). The typical coatings additives (G) may be used in customary amounts known to the skilled person, depending on the function of said additives and on the rest of the constitution of the coating composition.

Typical coatings additives (G) used may be, for example, antioxidants, stabilizers, especially UV stabilizers such as UV absorbers and suitable radical scavengers (especially HALS compounds, hindered amine light stabilizers), drying agents, antistatic agents, flame retardants, thickeners, thixotropic agents, surface-active agents (more particularly flow control additives, defoamers), viscosity modifiers (rheological additives), plasticizers, chelating agents and/or dispersants.

Suitable antioxidants comprise primary antioxidants, especially sterically hindered phenols, more particularly 2,6-di-tert-butyl-4-methylphenol (BHT) and preferably substituted (3,5-di-tert-butyl-4-hydroxyphenyl)propionic esters, secondary arylamines, and secondary antioxidants, more particularly aliphatic phosphites having aromatic and/or aliphatic substituents, phosphonites, phosphonates, thioethers, and/or others.

Suitable UV absorbers comprise oxanilides, triazines, and benzotriazole (the latter available, for example, as Tinuvin® grades from BASF SE) and benzophenones (e.g., Chimassorb® 81 from BASF SE). Preference is given, for example, to 95% benzenepropanoic acid, 3-(2H-benzotriazol-2-yl)-5-(1,1-dimethylethyl)-4-hydroxy-, C7-9-branched and linear alkyl esters; 5% 1-methoxy-2-propyl acetate (e.g., Tinuvin® 384) and α-[3-[3-(2H-benzotriazol-2-yl)-5-(1,1-dimethylethyl)-4-hydroxyphenyl]-1-oxopropyl]-ω-hydroxypoly (oxo-1,2-ethanediyl) (e.g. Tinuvin® 1130), in each case products, for example, of BASF SE. DL-alpha-Tocopherol, tocopherol, cinnamic acid derivatives, and cyanoacrylates can likewise be used for this purpose. The amount of the UV absorbers is dependent for example on the UV absorber itself, on other components of the coating composition, on the desired extent of UV protection, and on the film thickness of the cured coating material. Preference is given to 4-12 wt % at 10-20 μm, 2-6 wt % at 20-40 μm, and 1.5-3 wt % at 40-60 μm, based on the solid components present in the preparation.

These can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g. bis(2,2,6,6-tetramethyl-4-piperidyl) sebacate. They are obtainable, for example, as Tinuvin® products and Chimassorb® products from BASF SE. Preference in joint use with acids, however, is given to those hindered amines which are N-alkylated, examples being bis(1,2,2,6,6-pentamethyl-4-piperidinyl) [[3,5-bis(1,1-dimethylethyl)-4-hydroxyphenyl]-methyl]butylmalonate (e.g. Tinuvin® 144 from BASF SE); a mixture of bis(1,2,2,6,6-pentamethyl-4-piperidinyl) sebacate and methyl 1,2,2,6,6-pentamethyl-4-piperidinyl sebacate (e.g. Tinuvin® 292 from BASF SE); or which are N—(O-alkylated), such as, for example, decanedioic acid, bis(2,2,6,6-tetramethyl-1-(octyloxy)-4-piperidinyl) ester (e.g. Tinuvin® 123 from BASF SE). The amount of the HALS derivatives is dependent in particular on the HALS derivative itself, on other components of the coating composition, on the desired extent of UV protection, and on the degree of pigmentation of the coating material. Preference is given to 0.5-1.5% for clearcoats, 0.5-3% for semi-transparent systems, and 1-6% for opaque systems, based on the overall batch.

Thickeners contemplated include, in addition to radically (co)polymerized (co)polymers, customary organic and inorganic thickeners such as hydroxymethylcellulose or bentonite. Chelating agents which can be used include, for example, ethylenediamineacetic acid and salts thereof and also β-diketones.

The amounts of drying agents, antistatic agents, flame retardants, thickeners, thixotropic agents, surface-active agents (more particularly flow control additives, defoamers), viscosity modifiers (rheological additives), plasticizers, chelating agents and/or dispersants is dependent on factors including the additives, the overall formulation, and in particular including component (H). The amount of the dispersants is dependent more particularly on the nature and amount of the pigments, their active surface area, and their pretreatment.

As component (H) it is possible in addition for fillers, dyes and/or pigments to be present. The substances of component (H) may be used in customary amounts known to the skilled person, depending on their function and on the rest of the constitution of the coating composition, examples of amounts being from 0 to 40 wt % or from 1 to 40 wt %, based on the overall composition, solid on solid.

(Coloristically inert) fillers are all substances or compounds which on the one hand are coloristically inactive, i.e., exhibit a low intrinsic absorption and have a refractive index similar to that of the coating medium, and which on the other hand are capable of influencing the orientation (parallel alignment) of effect pigments in the surface coating, i.e., in the applied coating film, and also properties of the coating or of the coating compositions, such as hardness or rheology, for example. Inert substances or compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blanc fixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 µm, for example. Additionally as inert fillers it is possible to employ any desired solid inert organic particles, such as urea-formaldehyde condensates, micronized polyolefin wax and micronized amide wax, for example. The inert fillers may in each case also be used in a mixture. It is preferred, however, to use only one filler in each case. Preferred fillers comprise silicates, examples being silicates obtainable by hydrolysis of silicon tetrachloride, such as Aerosil® from Degussa, siliceous earth, talc, aluminum silicates, magnesium silicates, calcium carbonates, etc.

Dyes are colorants and differ from the pigments in their solubility in the application medium; i.e., they have a solubility at 25° C. of more than 1 g/1000 g in the application medium. Examples of dyes are azo, azine, anthraquinone, acridine, cyanine, oxazine, polymethine, thiazine, and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes, or substantive dyes.

Pigments in the true sense are, according to CD Römpp Chemie Lexikon—Version 1.0, Stuttgart/New York: Georg Thieme Verlag 1995, with reference to DIN 55943, particulate "colorants that are organic or inorganic, chromatic or achromatic, and are virtually insoluble in the application medium". Virtually insoluble here means a solubility at 25° C. of below 1 g/1000 g application medium, preferably below 0.5, more preferably below 0.25, very preferably below 0.1, and more particularly below 0.05 g/1000 g application medium. Examples of pigments in the true sense comprise any desired systems of absorption pigments and/or effect pigments, preferably absorption pigments. There are no restrictions whatsoever on the number and selection of the pigment components. They may be adapted as desired to the particular requirements, such as the desired perceived color, for example. Effect pigments are all pigments which exhibit a platelet-shaped construction and give a surface coating specific decorative color effects. The effect pigments are, for example, all of the pigments which impart effect and can be used customarily in vehicle finishing and industrial coating. Examples of such effect pigments are pure metallic pigments, such as aluminum, iron, or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example. The coloring absorption pigments are, for example, customary organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black. The amount of the pigments is dependent on factors including their nature and active surface area, the rest of the constitution of the coating composition, and the desired degree of covering. In the case of organic pigments, amounts of 10-15 wt % are customary, and in the case of inorganic pigments, 30-40 wt %, based on the overall formulation, solid on solid.

The one-component amino resin coating compositions of the invention preferably have a stoichiometry of amino resin (A) to the sum total of polyol (B) and polyester polyol (C) of 1:1 to 1:9, with the data relating to the components without solvent, solid on solid. The same applies to the proportions hereinafter. The precise composition is dependent on the raw material components and on the application. In the case of coil applications, a mixing ratio of around 1:4 to 1:5 is preferred; in the case of partly etherified melamine resins, the ratio is around 1:1.5 to 1:4, preferably 1:1.5 to 1:2.5.

The weight ratio of the hydroxyl-containing polymer (B) to branched polyester polyol (C) components is greater than 1:1, preferably up to 49:1, e.g., from 1.1:1 to 49:1, more preferably from 1.5:1 to 19:1, more particularly from 2.3:1 to 9:1, based on solids.

Examples of suitable coating compositions are those which comprise the synthesis components in the following amounts:

(A) 100 parts by weight of the amino resins (based on solid fraction)

(B) from 45 to 882 parts by weight, preferably 70 to 810 parts by weight, of the hydroxyl-containing polymers (in each case based on solid fractions)

(C) from 2 to 450 parts by weight, preferably from 10 to 270 parts by weight, of the branched polyester polyols (in each case based on solid fractions)
(D) optionally chemical crosslinkers, amounts depending on type and system
(E) from 0 to 80 wt %, preferably from 20 to 70 wt %, of organic solvents, based on the sum total of the amounts (A) to (G)
(F) from 0 to 10 parts by weight, preferably from 0.1 to 8 parts by weight, more preferably from 0.3 to 6 parts by weight, very preferably from 0.5 to 5 parts by weight, and more particularly from 1 to 3 parts by weight, of catalyst, based on the amino resin (A) used (solid on solid)
(G) optionally typical coatings additives, amounts depending on the type and system as described above
(H) optionally fillers, dyes and/or pigments, amounts depending on type and system.

Curing is preferably accomplished by carrying out drying and then curing after the coating of the substrates with the coating compositions or coating formulations, consisting of amino resin (A), hydroxyl-containing polymer (B), branched polyester polyol (C), optional crosslinkers (D), optional solvents (E), optional catalysts (F), optional additives (G), optional fillers, dyes and/or pigments (H). Drying takes place preferably under an oxygen-containing atmosphere, preferably air, or under inert gas.

In a preferred variant, as for example with completely etherified melamine-formaldehyde resins, more particularly with acid catalysis, especially for can and coil applications, curing takes place for example at a substrate temperature between 170 to 300° C., preferably 200 to 260° C. The oven temperature in this case may be significantly higher—up to about 400° C., for example. The curing time may typically be between 10 seconds and 10 minutes, depending on the resin and the application. Curing temperature and curing time are contrasting in tendency; e.g., 10-40 seconds at 200-260° C., or 10 minutes at 170-200° C.

In a preferred variant, as for example with partly etherified melamine-formaldehyde resins for automobile and industrial applications, for example, for clearcoat materials and pigmented topcoats, for example, it is possible to carry out thermal treatment (curing) at typically between 70 and 260° C., preferably 100 and 180° C., more particularly between 120 and 170° C., very preferably between 130 and 150° C. The curing time may typically be between 5 and 60 minutes, preferably from 10 to 40 minutes, more preferably between 20 to 30 minutes.

Optionally, especially in the case of furniture applications, drying is performed at a temperature below 80° C., preferably from room temperature (20° C.) to 60° C., and more preferably room temperature to 40° C., over a period of up to 72 hours, preferably up to 24 hours, more preferably up to 6 hours (in particular with acid catalysis).

In drying, solvent present is substantially removed, and there may also, moreover, already be a reaction with the binder, whereas curing encompasses essentially the reaction with the binder.

Coating-material curing takes place as a function of the amount of coating material applied and of the crosslinking energy introduced via high-energy radiation, heat transfer from heated surfaces, or via convection of gaseous media, over a period of from seconds, for example, in the case of coil coating in combination with NIR drying, up to 5 hours, for example, high-build systems on temperature-sensitive materials, usually not less than 10 minutes, preferably not less than 15, more preferably not less than 30, and very preferably not less than 45 minutes. Curing may also take place, additionally to or instead of the thermal curing, by IR and NIR radiation, with NIR radiation here denoting electromagnetic radiation in the wavelength range from 760 nm to 2.5 µm, preferably from 900 to 1500 nm.

The invention also provides a method for coating substrates, which comprises mixing amino resin (A) and polymer (B) and polyester polyol (C) as defined above with one another in a weight ratio of (A) relative to the sum total of (B) and (C) of preferably 1:1 to 1:9, where optionally further components (D) to (H) can be mixed in, and subsequently applying the mixture to the substrate. The coating of the substrates with the coating compositions of the invention takes place according to customary methods known to the skilled person, where at least one coating composition or coating formulation of the invention is applied in the desired thickness to the substrate that is to be coated, and the volatile constituents of the coating composition are removed (drying), optionally with heating. This operation may if desired be repeated one or more times. Application to the substrate may be made in a known way, as for example by spraying, troweling, knife coating, brushing, rolling, rollercoating, or flowcoating. The thickness of a film of this kind to be cured may be from 0.1 µm up to several mm, preferably from 1 to 2000 µm, more preferably 5 to 200 µm, very preferably from 5 to 60 µm (based on the coating material in the state in which the solvent has been removed from the coating material). Typical coating film thicknesses are 2 to 20 µm for coil coating with HMMM resins, and preferably up to about 50 µm for automobile applications with partly methylolated amino resins.

Examples of suitable substrates for the coating compositions of the invention are plastics substrates such as, for example, thermoplastic polymers, more particularly polymethyl methacrylates, polybutyl methacrylates, polyethylene terephthalates, polybutylene terephthalates, polyvinylidene fluorides, polyvinyl chlorides, polyesters, polyolefins, acrylonitrile-ethylene-propylene-diene-styrene copolymers (A-EPDM), polyetherimides, polyetherketones, polyphenylene sulfides, polyphenylene ethers, or mixtures thereof. Mention may further be made of polyethylene, polypropylene, polystyrene, polybutadiene, polyesters, polyamides, polyethers, polycarbonate, polyvinyl acetal, polyacrylonitrile, polyacetal, polyvinyl alcohol, polyvinyl acetate, phenolic resins, urea resins, melamine resins, alkyd resins, epoxy resins, or polyurethanes, their block copolymers or graft copolymers, and blends thereof. Preferred substrates include ABS, AES, AMMA, ASA, EP, EPS, EVA, EVAL, HDPE, LDPE, MABS, MBS, MF, PA, PA6, PA66, PAN, PB, PBT, PBTP, PC, PE, PEC, PEEK, PEI, PEK, PEP, PES, PET, PETP, PF, PI, PIB, PMMA, POM, PP, PPS, PS, PSU, PUR, PVAC, PVAL, PVC, PVDC, PVP, SAN, SB, SMS, UF, and UP plastics (codes according to DIN 7728), and aliphatic polyketones. Particularly preferred plastics substrates are polyolefins, such as PP (polypropylene) for example, which may alternatively be isotactic, syndiotactic or atactic and may alternatively be unoriented or oriented by uniaxial or biaxial stretching, SAN (styrene-acrylonitrile copolymers), PC (polycarbonates), PVC (polyvinyl chlorides), PMMA (polymethyl methacrylates), PBT (poly(butylene terephthalate)s), PA (polyamides), ASA (acrylonitrile-styrene-acrylic ester copolymers), and ABS (acrylonitrile-butadiene-styrene copolymers), and also their physical mixtures (blends). Particularly preferred are PP, SAN, ABS, ASA, and blends of ABS or ASA with PA or PBT or PC. Especially preferred are polyolefins, PMMA, and PVC. Especially preferred plastics substrates are ASA, more particularly according to DE 196 51 350, and the ASA/PC blend. Likewise preferred is polymethyl methacrylate (PMMA) or impact-modified PMMA.

A preferred substrate for coating with the coating compositions of the invention are metals, which may optionally have been pretreated with an (adhesion) primer or with another coating film. The metal may in principle be of any desired type. More particularly, however, the metals or alloys involved are those which are customarily employed as metallic materials of construction, and which require protection from corrosion.

More particularly the surfaces involved are those of iron, steel, zinc, zinc alloys, aluminum, or aluminum alloys. These may be the surfaces of elements consisting wholly of the said metals and/or alloys. Alternatively, the elements may also be only coated with these metals, and may themselves consist of other kinds of materials, as for example of different metals, alloys, polymers, or composites. They may be surfaces of castings, made from galvanized iron or steel. In one preferred embodiment of the present invention, the surfaces involved are steel surfaces.

Zn alloys or Al alloys are known to the skilled person. The skilled person selects the type and amount of alloying constituents according to the desired end application. Typical constituents of zinc alloys include, in particular, Al, Pb, Si, Mg, Sn, Cu, or Cd. Typical constituents of aluminum alloys include, in particular, Mg, Mn, Si, Zn, Cr, Zr, Cu, or Ti. The alloys involved may also be Al/Zn alloys, in which Al and Zn are present in approximately equal amounts. Steel coated with alloys of these kinds is available commercially. The steel may comprise the customary alloying components known to the skilled person.

Also preferred is the application of the coating compositions of the invention for the treatment of optionally pretreated galvanized, more particularly hot dip galvanized, iron/steel (tinplate), or aluminum, especially for coil applications.

The coating compositions and coating formulations of the invention are additionally suitable for the coating of substrates such as wood, wood veneer, paper, paperboard, cardboard, textile, film, leather, nonwoven, plastics surfaces, glass, ceramic, mineral building materials, such as molded cement blocks or fiber cement slabs, or metals, it being possible for the substrates in each case to have optionally been precoated or pretreated. Preferred are metals and plastics, which may optionally have been precoated or pretreated.

The coating compositions or coating formulations of the invention are suitable as interior or exterior coatings, in other words applications involving exposure to daylight, preferably on parts of buildings, coatings on aircraft and vehicles. More particularly the melamine-formaldehyde resins and coating compositions of the invention are used as or in automotive clearcoat and topcoat material(s). Other preferred fields of use are can coating and coil coating. In particular they are suitable as primers, surfacers, pigmented topcoat materials, and clearcoat materials in the sectors of industrial coating, wood coating, automotive finishing, especially OEM finishing, or decorative coating. The coating materials are especially suitable for applications involving a requirement for particularly high reliability of application, external weathering resistance, optical qualities, solvent resistance and/or chemical resistance, particularly when high chemical resistance, a good balance of hardness to elasticity, and rapid drying are required.

The present invention additionally provides substrates coated with a coating composition of the invention.

EXAMPLES

Substances used in the examples:

| | |
|---|---|
| Hexahydrophthalic anhydride | Aldrich. m.p. 33° C. Is melted in an oven before use |
| Dimethyl adipate | Aldrich. Liquid |
| Trimethylolpropane | Aldrich. White flakes, melting point 56-58° C. |
| Neopentyl glycol | Solid, m.p. 127° C. |
| 2-Butyl-2-ethyl-1,3-propanediol | TCI (Tokyo Chemical Industry). Melting point 43° C.; is melted over a waterbath before use |
| Joncryl ® 504: | Polyacrylate-ol, OH number 140 mg KOH/g, 80% solids content in xylene; BASF SE, Ludwigshafen |
| Dynapol ® LH 832-02 | Branched polyester polyol, 60% in solvent naphtha 150/butyl glycol |
| Luwipal ® 018: | n-Butanol etherified melamine-formaldehyde resin in n-butanol especially for automotive applications. 73% NVF (2 g/2 h/125° C.). 5.5 Pa * s (23° C.). BASF SE |
| Luwipal ® 066 LF: | Methanol etherified melamine-formaldehyde resin in methanol (HMMM resin). 94.5% NVF (2 g/2 h/125° C.). 4.0 Pa * s (23° C.). BASF SE |
| Nacure ® 2500: | Amine-neutralized para-toluenesulfonic acid. Blocked catalyst. King Industries |
| Nacure ® 2558: | Blocked para-toluenesulfonic acid |
| Solvenon ® PM | 1-Methoxy-propan-2-ol, solvent, BASF SE |
| Solvesso ® 150 | ExxonMobil Chemical, aromatic solvent, b.p. 180-193° C. |

Hydroxyl numbers of the branched polyesterols are determined on the basis of DIN 53240-2:2007-11. The acid number is taken into account in the calculation.

Acid numbers of the branched polyesterols are determined according to DIN EN ISO 2114:2000, Method A.

Unless otherwise indicated, the figures for polydispersity and also for number-average and weight-average molecular weight $M_n$ and $M_w$ refer to measurements by gel permeation chromatography, using polymethyl methacrylate as standard and tetrahydrofuran as eluent, with the parameters specified in the examples. Molar masses and polydispersities are determined by gel permeation chromatography with TÜV-certified PMMA standards from PSS (Polymer Standards Service; DIN EN ISO 9001:2000, certificate: 01 100 84065). These standards are characterized according to the requirements of DIN 55672 and ISO/EN 13885.

GPC takes place using:

Instrument: PSS Agilent Technologies 1260 Infinity

Columns: 1×PLGel Mixed E Guard (precolumn), length 5 cm, diameter 0.75 cm

1×PLGel Mixed E, length 30 cm, diameter 0.75 cm

1×PLGel Resipore, length 30 cm, diameter 0.75 cm

Solvent: THF

Flow rate: 1 mL/min

Injection volume: 50 μL

Concentration: 1 g/L

Temperature: room temperature (20° C.).

Unless otherwise indicated, the glass transition temperature $T_g$ in this specification is determined according to ASTM D3418-03 via differential scanning calorimetry (DSC), with a heating rate of 10° C./min.

Viscosities are reported in this specification at 23° C. according to DIN EN ISO 3219/A.3 in a cone/plate system with a shear gradient of 1000 s$^{-1}$, unless otherwise noted.

The nonvolatile fraction (NVF) was determined according to the thermogravimetric principle, with the aid of a HB43-S Moisture Analyzer from Mettler Toledo. For this purpose, approximately 2 g of the sample were weighed out into an aluminum sample pan having a diameter of 90 mm (HA-D90) and heated at 150° C. to constant weight.

Synthesis Examples

In laboratory experiments, trimethylolpropane and neopentyl glycol were introduced as solids to the reactor. Hexahydrophthalic anhydride and 2-butyl-2-ethyl-1,3-propanediol were added in the melted state.

Example B1

Hexahydrophthalic Anhydride/Trimethylolpropane/Neopentyl Glycol=1.0:0.5:0.5

In a four-neck flask with reflux condenser and water separator, trimethylolpropane (490.9 g), neopentyl glycol (381.0 g), and hexahydrophthalic anhydride (1128.1 g) were introduced under a nitrogen atmosphere and heated to 160-180° C. with stirring. After a reaction time of 5 hours and on attainment of an acid number of 85 mg KOH/g (80% conversion), the batch was cooled to 120° C., 631.3 g of butyl acetate were added, and cooling was continued.

Example B2

Hexahydrophthalic Anhydride/Trimethylolpropane=1.2:1.0

In a four-neck flask with reflux condenser and water separator, trimethylolpropane (840.8 g) and hexahydrophthalic anhydride (1159.2 g) were introduced under a nitrogen atmosphere and heated to 160-180° C. with stirring. After a reaction time of 5 hours and on attainment of an acid number of 83 mg KOH/g (81% conversion), the batch was cooled to 120° C., 1017.1 g of butyl acetate were added, and cooling was continued.

Example B3

In a four-neck flask with water separator, trimethylolpropane (930.7 g) and hexahydrophthalic anhydride (1069.3 g) were introduced under a nitrogen atmosphere at room temperature, and fully melted, and the melt was heated gradually to 160-180° C. with stirring. After a reaction time of about 5 hours and on attainment of an acid number of 74 mg KOH/g (82% conversion), the batch was cooled to 120° C., 814 g of butyl acetate were added, and cooling was continued.

Example B4

Hexahydrophthalic Anhydride/Trimethylolpropane/Dimethyl Adipate=1.0:1.5:0.5 with Tetrabutyl Orthotitanate as Catalyst In a four-neck flask with water separator, trimethylolpropane (778.0 g), hexahydrophthalic anhydride (596.0 g), and tetrabutyl orthotitanate (0.5 g) were introduced under a nitrogen atmosphere and heated to 160-180° C. with stirring. After a reaction time of 10 hours and on attainment of an acid number of 42 mg KOH/g, dimethyl adipate (337.0 g) was added at 140° C. After a further 10 hours at 180° C., with an acid number of 22 mg KOH/g attained, the batch was cooled to 120° C., 511.0 g of butyl acetate were added, and cooling was continued.

Example B5

Hexahydrophthalic Anhydride/Trimethylolpropane/2-Butyl-2-Ethyl-1,3-Propanediol=1.2:0.8:0.2

In a four-neck flask with reflux condenser and water separator, trimethylolpropane (330.9 g), melted 2-butyl-2-ethyl-1,3-propanediol (98.8 g), and hexahydrophthalic anhydride (570.3 g) were introduced under a nitrogen atmosphere and heated to 160-180° C. with stirring. After a reaction time of 5 hours and on attainment of an acid number of 98 mg KOH/g (78% conversion), the batch was cooled to 120° C., 407.0 g of butyl acetate were added, and cooling was continued.

Example B6

Hexahydrophthalic Anhydride/Trimethylolpropane=1.1:1.0

In a four-neck flask with reflux condenser and water separator, trimethylolpropane (530.1 g) and hexahydrophthalic anhydride (669.9 g) were introduced under a nitrogen atmosphere and heated to 160-180° C. with stirring. After a reaction time of 5 hours and on attainment of an acid number of 77 mg KOH/g (82% conversion), the batch was cooled to 120° C., 283.3 g of butyl acetate were added, and cooling was continued.

Example B7

Hexahydrophthalic Anhydride/Trimethylolpropane=1.0:1.0 (with Lower Acid Number)

In a four-neck flask with water separator, trimethylolpropane (930.7 g) and hexahydrophthalic anhydride (1069.3 g) were introduced under a nitrogen atmosphere and heated to 160° C. with stirring. This temperature was held for about 30 minutes, then raised to 180° C. After a reaction time of about 10 hours and on attainment of an acid number of 54 mg KOH/g, the batch was cooled to 120° C., and the product was diluted to 75% with butyl acetate and cooled further.

Example B8

Hexahydrophthalic Anhydride/Trimethylolpropane=1.0:1.0 (with Lower Acid Number)

In a four-neck flask with water separator, trimethylolpropane (465.3 g) and hexahydrophthalic anhydride (534.7 g) were introduced under a nitrogen atmosphere and heated to 160° C. with stirring. This temperature was held for about 30 minutes, then raised to 180° C. After a reaction time of about 8 hours and on attainment of an acid number of 46 mg KOH/g, the batch was cooled to 120° C., and the product was diluted to 70% with 288.4 g of butyl acetate and cooled further.

Example B9

Hexahydrophthalic Anhydride/Trimethylolpropane/2-butyl-2-ethyl-1,3-propanediol=1.0:0.5:0.5

In a four-neck flask with water separator, trimethylolpropane (22.6 g), 2-butyl-2-ethyl-1,3-propanediol (265.90 g), and hexahydrophthalic anhydride (511.5 g) were introduced under a nitrogen atmosphere and heated to 160° C. with stirring. This temperature was held for about 30 minutes, then raised to 180° C. After a reaction time of about 4 hours and on attainment of an acid number of 86 mg KOH/g, the batch was cooled to 120° C., and the product was diluted to 75% with 229.3 g of butyl acetate and cooled further.

Example B10

Hexahydrophthalic Anhydride/Trimethylolpropane/Neopentyl Glycol=2:1.67:1

In a four-neck flask with water separator, trimethylolpropane (352.0 g), neopentyl glycol (163.6 g), and hexahydrophthalic anhydride (484.4 g) were introduced under a nitrogen atmosphere and heated to 160° C. with stirring. This temperature was held for about 30 minutes, then raised to 180° C. After a reaction time of about 9 hours and on attainment of an acid number of 41 mg KOH/g, the batch was cooled to 160° C. and reduced pressure of 200 mbar was applied for 3½ hours. Thereafter the acid number was 35 mg KOH/g. The product was cooled to 120° C. and diluted to 70% with 284.64 g of butyl acetate and cooled further.

Example B11

Hexahydrophthalic Anhydride/Trimethylolpropane/Neopentyl Glycol=2:1:1.27

In a four-neck flask with water separator, trimethylolpropane (267.6 g), neopentyl glycol (219.9 g), and hexahydrophthalic anhydride (512.5 g) were introduced under a nitrogen atmosphere and heated to 160° C. with stirring. This temperature was held for about 30 minutes, then raised to 180° C. After a reaction time of about 2½ hours and on attainment of an acid number of 62 mg KOH/g, the batch was cooled to 160° C. and reduced pressure of 200 mbar was applied for 1 hour. Thereafter the acid number was 42 mg KOH/g. The reduced pressure was removed, and the product was cooled to 120° C. and diluted to 70% with 285.3 g of butyl acetate and cooled further. Under reduced pressure, some sublimed product had formed in the condenser.

The B examples are summarized in table 1.

TABLE 1

Polyester polyols Examples B

| | OHN mg KOH/g | AN mg KOH/g | Mn D | Mw D | PDI | Tg ° C. | Cat. | Visco mPa*s | NVF % |
|---|---|---|---|---|---|---|---|---|---|
| B1 | 191 | 85 | 1032 | 1438 | 1.4 | 17 | none | 4540 | 75 |
| B2 | 188 | 83 | 1483 | 3310 | 2.2 | 47 | none | 3010 | 65 |
| B3 | 257 | 74 | 1133 | 1780 | 1.6 | 24 | none | 4010 | 70 |
| B4 | 250 | 22 | 1798 | 5339 | 3.0 | 4 | TBOT | 4830 | 75 |
| B5 | 158 | 98 | 1255 | 2112 | 1.7 | 35 | none | 4720 | 70 |
| B6 | 219 | 77 | 1176 | 2701 | 2.3 | 41 | none | 3110 | 80 |
| B7 | 254 | 49 | 1568 | 3709 | 2.4 | 36 | none | | 75 |
| B8 | 239 | 44 | 1764 | 5310 | 3.0 | | none | 25040 | 73.7 |
| B9 | 162 | 83 | 1030 | 1433 | 1.4 | 12 | none | 21500 | 75 |
| B10 | 271 | 33 | 1136 | 1589 | 1.4 | 20 | none | 5220 | 70 |
| B11 | 198 | 42 | 1212 | 1886 | 1.6 | 23 | none | 7530 | 70 |

PDI: Polydispersity;
AN: Acid number;
OHN: OH number;
Visco: Viscosity;
Cat.: Catalyst;
NVF: Nonvolatile fraction Coating Compositions and Comparative Performance Tests:

The properties tested were as follows:

The pendulum hardness was determined according to König on glass plates (isothermally) or on deep-drawn metal panels (gradient oven 80-180° C.) (DIN EN ISO 1522).

The development of crosslinking density (chemical resistance) was determined firstly by the methyl ethyl ketone (MEK) double rub test, based on DIN EN 13523-11 and ASTM D5402-06, on a metal Bonder panel. This test took place on a Crockmeter apparatus with a force of 7 newtons, with double rubs until the coating was destroyed. Every 50 double rubs, the felt was moistened with MEK by syringe from the tube above. Felt inserts are for the LINEART-ESTER 249 scratch hardness tester from Erichsen.

The development of crosslinking density (chemical resistance) was determined secondly by the xylene test on a deep-drawn metal panel after curing in a gradient oven at 80-180° C. for 24 hours at a film thickness of 40-50 μm. For this purpose, the deep-drawn metal panel was immersed half-way into a xylene bath for 10 minutes, thereafter first rubbed down with a cloth and subsequently scratched with a wooden spatula in order to remove uncured or undercured areas of paint.

0% curing: The coating is dissolved by xylene or can be wiped off with the cloth 50% curing: The coating is not removed by xylene and cloth, but can be scratched off using the wooden spatula 100% curing: The coating is not removed even by the wooden spatula The measurement areas on the gradient oven are graduated in approximately 10° C. graduations. In each case the temperature at which 50% or 100% curing was first measured has been reported.

The Erichsen cupping was determined according to DIN EN ISO 1520 on a deep-drawn metal panel.

For the determination of the chemical resistance for automobile applications, a coated, deep-drawn metal panel (gradient oven metal panel) was cured for 20 minutes at 140° C. and 16-24 hours (23±2)° C. and (50±10) % humidity. Thereafter, using an Eppendorf pipette, drops of the test substances sulfuric acid (1%; 25 μl), aqueous sodium hydroxide (1%; 25 μl), pancreatin (50 μl), and tree resin (25 μl) were applied to each heating element (30-75° C.). For the last two agents, every second heating element was missed out. The test panel was then placed into the gradient oven (from BYK Gardner) and thermally conditioned at 30-75° C. for 30 minutes. After the end of this operation, the panel was cleaned to remove the sulfuric acid and the sodium hydroxide solution, using fully demineralized water. The panel was subsequently cleaned with hot water and a soft cloth to remove the adhering pancreatin. Thereafter the tree resin was cleaned, thoroughly but gently, using a soft cloth and wash benzine. Lastly, the panel was washed off thoroughly but gently using cold water, and the remaining drops of water were removed using a soft paper towel. After 24 hours of conditioning at 23±2° C. and 50±10% humidity, evaluation took place. A record was made of the temperature at which the first attack on the coating is perceptible under artificial light.

Tree resin source: Wörwag, tree resin solution DBL 5416 No.: 701014

Pancreatin (from Merck. Art. 7130) is mixed 1:1 wt % with fully demineralized water in a porcelain mortar.

The impact and re-impact tests were conducted according to DIN EN ISO 6272-1. For the impact tester, a falling weight of four pounds and a hemisphere with a 20 mm diameter were used.

The pencil hardness was determined according to DIN EN 13523-4 with a set of pencils from Cretacolor or Faber Castell (range: 6 B-6 H).

Test Series 1: Pendulum Hardness with Joncryl® 504

Comparison of mixtures of polyacrylate-ol/inventive polyester polyols B1-B4 with polyacrylate-ol Joncryl® 504 without inventive polyester polyols in development of pendulum hardness at 100° C. over a cure time of 10 to 60 minutes in a 7:3 (solid/solid) polyols/Luwipal® 018 system.

Luwipal® 018 is an amino resin typically used in automotive clearcoats. The mixing ratios for Joncryl® 504/polyester polyol were "10:0" (reference); 9:1, 8:2, and 7:3 solid/solid. Films were applied to 150 µm wet to glass plates, using a four-way bar applicator. The flash-off time was 10 minutes. Dry film thicknesses after curing at 100° C. were approximately 40 µm. The pendulum hardness was measured after 5-10 minutes. For all four polyester polyols in each of the three mixtures (9:1; 8:2; 7:3), the pendulum hardnesses over the entire cure time are higher than without polyester polyol (10:0). The more polyester polyol was used in the mixture, the higher the pendulum hardnesses.

Test Series 2: Film Properties Via the Temperature with Joncryl® 504

Comparison of mixtures of polyacrylate-ol Joncryl® 504/inventive polyesterols B1-B4 relative to polyacrylate-ol Joncryl® 504 without inventive polyester polyol in development of pendulum hardness, Erichsen cupping, and crosslinking density in a 7:3 (solid/solid) polyols/Luwipal® 018 system. The mixing ratios of Joncryl® 504/polyester polyol were 9:1, 8:2, and 7:3 solid/solid. Films were applied at 150 µm wet using a four-way bar applicator to a deep-drawn metal panel for the gradient oven. Curing took place after 10 minutes' flash-off in a temperature gradient of 80-180° C. for 20 minutes with storage overnight at (23±2)° C. and (50±10)% humidity. The dry film thicknesses were 40-50 µm.

The pendulum hardnesses with branched polyester polyol are slightly to significantly better than without. They improve in line with the proportion of polyester polyol. With the formulations of B1, the Erichsen cupping is on average, unsystematically, somewhat poorer for the 90:10 mixture, significantly better for the 80:20 mixture, and comparable for the 70:30 mixture; in the case of B2 and B3, it is on average identical with the reference, and in the case of B4 it is significantly better. Looking at pendulum hardness and Erichsen cupping together, the polyester polyols of the invention are a gain. The crosslinking density in blends of all four polyester polyols is better than without.

TABLE 2

Formulations for the pendulum hardnesses of test series 1

| Component [g] | NVF % | Joncryl® 504 Reference 10:0 | Joncryl® 504/B1 9:1 | 8:2 | 7:3 | Joncryl® 504/B2 9:1 | 8:2 | 7:3 |
|---|---|---|---|---|---|---|---|---|
| Joncryl® 504 | 80.0 | 52.5 | 47.3 | 42.0 | 36.8 | 47.3 | 42.0 | 36.8 |
| Luwipal® 018 | 72.7 | 24.8 | 24.8 | 24.8 | 24.8 | 24.8 | 24.8 | 24.8 |
| B1 | 75.0 | | 5.6 | 11.2 | 16.8 | | | |
| B2 | 65.0 | | | | | 6.5 | 12.9 | 19.4 |
| X/S = 7:3 | | 22.8 | 22.3 | 22.0 | 21.6 | 21.4 | 20.3 | 19.0 |
| Nacure® 2500 | 25.0 | 0.72 | 0.72 | 0.72 | 0.72 | 0.72 | 0.72 | 0.72 |

| Component | NVF % | Joncryl® 504/B3 9:1 | 8:2 | 7:3 | Joncryl® 504/B4 9:1 | 8:2 | 7:3 |
|---|---|---|---|---|---|---|---|
| Joncryl® 504 | 80.0 | 47.3 | 42.0 | 36.8 | 47.3 | 42.0 | 36.8 |
| Luwipal® 018 | 72.7 | 24.8 | 24.8 | 24.8 | 24.8 | 24.8 | 24.8 |
| B3 | 70.0 | 6.0 | 12.0 | 18.0 | | | |
| B4 | 75.0 | | | | 5.6 | 11.2 | 16.8 |
| X/S = 7:3 | | 21.9 | 21.2 | 20.4 | 22.3 | 22.0 | 21.6 |
| Nacure® 2500 | 25.0 | 0.72 | 0.72 | 0.72 | 0.72 | 0.72 | 0.72 |

(X/S = xylene/Solvenon® PM. Nacure® 2500 is 1% based on amino resin, solid/solid)

TABLE 3

Pendulum hardnesses in swings for test series 1

| Component | 10 min | 20 min | 30 min | 40 min | 50 min | 60 min |
|---|---|---|---|---|---|---|
| Joncryl 504, Reference | 3 | 18 | 27 | 34 | 42 | 53 |
| Joncryl 504/B1 = 9:1 | 8 | 29 | 39 | 48 | 54 | 68 |
| Joncryl 504/B1 = 8:2 | 10 | 37 | 59 | 69 | 76 | 86 |
| Joncryl 504/B1 = 7:3 | 17 | 50 | 73 | 83 | 90 | 99 |
| Joncryl 504/B2 = 9:1 | 4 | 28 | 47 | 54 | 64 | 73 |
| Joncryl 504/B2 = 8:2 | 14 | 44 | 64 | 73 | 80 | 88 |
| Joncryl 504/B2 = 7:3 | 35 | 66 | 79 | 91 | 96 | 102 |
| Joncryl 504/B3 = 9:1 | 3 | 23 | 40 | 50 | 57 | 66 |
| Joncryl 504/B3 = 8:2 | 12 | 40 | 63 | 71 | 74 | 88 |
| Joncryl 504/B3 = 7:3 | 25 | 63 | 81 | 88 | 93 | 100 |
| Joncryl 504/B4 = 9:1 | 1 | 18 | 26 | 38 | 43 | 55 |
| Joncryl 504/B4 = 8:2 | 1 | 19 | 32 | 42 | 50 | 60 |
| Joncryl 504/B4 = 7:3 | 2 | 25 | 43 | 45 | 59 | 68 |

TABLE 4

Joncryl® 504/B1: Pendulum hardnesses and Erichsen cupping

| | Pendulum hardness [swings] | | | | Erichsen cupping [mm] | | | |
|---|---|---|---|---|---|---|---|---|
| T [° C.] | Joncryl® 504 Reference | 9:1 | 8:2 | 7:3 | J. 504 | 9:1 | 8:2 | 7:3 |
| 80 | sticks | sticks | sticks | sticks | 10 | 10 | 10 | 10 |
| 89 | sticks | 3 | 4 | 13 | 10 | 10 | 10 | 10 |
| 100 | 17 | 27 | 34 | 42 | 10 | 10 | 10 | 9.8 |
| 109 | 50 | 66 | 70 | 81 | 9.4 | 8.9 | 10 | 9 |

TABLE 4-continued

Joncryl ® 504/B1: Pendulum hardnesses and Erichsen cupping

| T [° C.] | Pendulum hardness [swings] | | | | Erichsen cupping [mm] | | | |
|---|---|---|---|---|---|---|---|---|
| | Joncryl ® 504 Reference | 9:1 | 8:2 | 7:3 | J. 504 | 9:1 | 8:2 | 7:3 |
| 120 | 90 | 95 | 103 | 104 | 7.4 | 7.2 | 9.2 | 7.5 |
| 132 | 109 | 112 | 118 | 123 | 5.5 | 4.5 | 7.7 | 5.9 |
| 143 | 115 | 115 | 122 | 129 | 3.2 | 3.3 | 5.7 | 3.5 |
| 157 | 119 | 121 | 124 | 130 | 1.9 | 1.8 | 3.2 | 2.3 |
| 168 | 123 | 130 | 129 | 133 | 1.7 | 0.4 | 1.7 | 1.7 |
| 180 | 125 | 133 | 135 | 136 | 1.3 | 0.7 | 2.5 | 1.2 |

TABLE 5

Joncryl ® 504/B2: Pendulum hardnesses and Erichsen cupping

| T [° C.] | Pendulum hardness [swings] | | | | Erichsen cupping [mm] | | | |
|---|---|---|---|---|---|---|---|---|
| | Joncryl ® 504 Reference | 9:1 | 8:2 | 7:3 | J. 504 | 9:1 | 8:2 | 7:3 |
| 80 | sticks | sticks | 1 | 10 | 10 | 10 | 10 | 10 |
| 89 | sticks | 1 | 13 | 16 | 10 | 10 | 10 | 10 |
| 100 | 17 | 22 | 49 | 77 | 10 | 10 | 9.8 | 9.9 |
| 109 | 50 | 46 | 94 | 90 | 9.4 | 9.2 | 8.4 | 9 |
| 120 | 90 | 92 | 114 | 118 | 7.4 | 7.7 | 7 | 7.7 |
| 132 | 109 | 108 | 120 | 127 | 5.5 | 6 | 4.9 | 6 |
| 143 | 115 | 118 | 122 | 129 | 3.2 | 4.6 | 3.5 | 3.1 |
| 157 | 119 | 121 | 123 | 129 | 1.9 | 2.6 | 2.7 | 2.4 |
| 168 | 123 | 136 | 125 | 139 | 1.7 | 1.7 | 1.2 | 1.2 |
| 180 | 125 | 131 | 129 | 143 | 1.3 | 1.8 | 0.9 | 1.3 |

TABLE 6

Joncryl ® 504/B3: Pendulum hardnesses and Erichsen cupping

| T [° C.] | Pendulum hardness [swings] | | | | Erichsen cupping [mm] | | | |
|---|---|---|---|---|---|---|---|---|
| | Joncryl ® 504 Reference | 9:1 | 8:2 | 7:3 | J. 504 | 9:1 | 8:2 | 7:3 |
| 80 | sticks | sticks | 1 | 2 | 10 | 10 | 10 | 10 |
| 89 | sticks | 2 | 11 | 14 | 10 | 10 | 10 | 10 |
| 100 | 17 | 20 | 30 | 43 | 10 | 10 | 9.6 | 9.7 |
| 109 | 50 | 51 | 69 | 85 | 9.4 | 8.9 | 8.8 | 8.7 |
| 120 | 90 | 98 | 100 | 117 | 7.4 | 7.1 | 7.5 | 7.3 |
| 132 | 109 | 113 | 109 | 125 | 5.5 | 5.5 | 5.6 | 5.6 |
| 143 | 115 | 118 | 116 | 128 | 3.2 | 3.5 | 4 | 4.1 |
| 157 | 119 | 123 | 121 | 131 | 1.9 | 2.2 | 1.9 | 2.2 |
| 168 | 123 | 126 | 127 | 134 | 1.7 | 1.7 | 1.7 | 1.4 |
| 180 | 125 | 128 | 129 | 140 | 1.3 | 1.7 | 1.5 | 1.3 |

TABLE 7

Joncryl ® 504/B4: Pendulum hardnesses and Erichsen cupping

| T [° C.] | Pendulum hardness [swings] | | | | Erichsen cupping [mm] | | | |
|---|---|---|---|---|---|---|---|---|
| | Joncryl ® 504 Reference | 9:1 | 8:2 | 7:3 | J. 504 | 9:1 | 8:2 | 7:3 |
| 80 | sticks | sticks | sticks | sticks | 10 | 10 | 10 | 10 |
| 89 | sticks | sticks | sticks | 3 | 10 | 10 | 10 | 10 |

TABLE 7-continued

Joncryl ® 504/B4: Pendulum hardnesses and Erichsen cupping

| T [° C.] | Pendulum hardness [swings] | | | | Erichsen cupping [mm] | | | |
|---|---|---|---|---|---|---|---|---|
| | Joncryl ® 504 Reference | 9:1 | 8:2 | 7:3 | J. 504 | 9:1 | 8:2 | 7:3 |
| 100 | 17 | 17 | 19 | 25 | 10 | 10 | 10 | 10 |
| 109 | 50 | 53 | 56 | 61 | 9.4 | 9.3 | 9.9 | 9.6 |
| 120 | 90 | 95 | 96 | 103 | 7.4 | 7.3 | 8.2 | 8 |
| 132 | 109 | 110 | 104 | 107 | 5.5 | 5.9 | 7.2 | 6.6 |
| 143 | 115 | 119 | 120 | 122 | 3.2 | 3.3 | 4.4 | 4.3 |
| 157 | 119 | 123 | 122 | 126 | 1.9 | 2.6 | 3.4 | 2.4 |
| 168 | 123 | 126 | 127 | 128 | 1.7 | 1.7 | 2.1 | 2.2 |
| 180 | 125 | 129 | 134 | 135 | 1.3 | 2.6 | 1.5 | 2.5 |

TABLE 8

Joncryl ® 504/B1-B2 (top)/B3-B4 (bottom)
Crosslinking density (xylene test) [° C.]

| | Joncryl ® 504 Reference | Joncryl ® 504/B1 | | | Joncryl ® 504/B2 | | |
|---|---|---|---|---|---|---|---|
| | | 9:1 | 8:2 | 7:3 | 9:1 | 8:2 | 7:3 |
| 50% | 120 | 120 | 120 | 120 | 120 | 109 | 109 |
| 100% | 143 | 132 | 132 | 132 | 132 | 120 | 120 |

| | Joncryl ® 504/B3 | | | Joncryl ® 504/B4 | | |
|---|---|---|---|---|---|---|
| | 9:1 | 8:2 | 7:3 | 9:1 | 8:2 | 7:3 |
| 50% | 120 | 120 | 120 | 120 | 120 | 120 |
| 100% | 132 | 120 | 120 | 132 | 132 | 120 |

Test Series 3: Chemical Resistance for Automobiles with Joncryl® 504

Comparison of mixtures of polyacrylate-ol/inventive polyester polyol B3 relative to polyacrylate-ol Joncryl® 504 without polyester polyol in chemical resistance. The coatings were cured at 140° C. for 20 minutes and for 16-24 hours at (23±2)° C. and (50±10)% humidity.

The greater the amount of polyester polyol used, the better the resistances. In its sulfuric acid resistance, the 8:2 mixture is poorer while being equal in the case of pancreatin and tree resin, and better by 3° C. for 5% aqueous sodium hydroxide than the reference, and hence, on average, is comparable. The 7:3 mixture is in accordance with the reference for sulfuric acid, the resistances otherwise being significantly better by 9 to 20° C. than the reference.

TABLE 9

Chemical resistances for automobiles (° C.)

| | 1% H2SO4 | 5% NaOH | Pancreatin | Tree resin |
|---|---|---|---|---|
| Joncryl ® 504, Reference | 45 | 55 | 50 | ≤30 |
| Joncryl ® 504/B3 = 8:2 | 42 | 58 | 50 | ≤30 |
| Joncryl ® 504/B3 = 7:3 | 45 | 64 | 63 | 50 |

Test Series 4:

Comparison of mixtures of polyester polyol/inventive polyester polyols B1, B3, B4 relative to polyester polyol without inventive polyester polyols in a coil coating application in a 4.4:1 (solid/solid) polyol/Luwipal® 066 LF system. Luwipal® 066 LF is an amino resin typically used in coil coating materials. The mixing ratios of polyester polyol/inventive polyester polyol were 7:3 solid/solid. Films were applied to 50 μm wet with a wire doctor. Curing took place for 30 seconds in a coil oven at 300° C. (peak metal temperature 260° C.), with subsequent storage for 16-24 hours at (23±2°)° C. and (50±10)% humidity. The dry film thickness was 20-22 μm.

For the mixtures according to the invention, the cross-linking density (MEK double rubs) is better, the pencil hardness higher, the Erichsen cupping somewhat lower, and the impact and re-impact identical. All in all, therefore, the addition of the inventive polyester polyols produces an improvement in the film properties.

TABLE 10

Resin compositions and results of coil coating application

| Raw materials | NVF [%] | Reference | B1 | B3 | B4 |
|---|---|---|---|---|---|
| Dynapol ® LH 832-02 | 60 | 78.9 | 55.2 | 55.2 | 55.2 |
| Luwipal ® 066 LF | 95.6 | 10.3 | 10.3 | 10.3 | 10.3 |
| B1 | 75 | | 19.0 | | |
| B3 | 70 | | | 20.3 | |
| B4 | 75 | | | | 19 |
| Nacure ® 2558 | | 0.2 | 0.2 | 0.2 | 0.2 |
| Butyl glycol | | 2.7 | 2.7 | 2.7 | 2.7 |
| Solvesso ® 150 | | 7.9 | 7.9 | 7.9 | 7.9 |
| MEK [double rubs] | | <150 | >200 | >200 | >200 |
| Impact (4 pound) [inch-pound] | | 160 | 160 | 160 | 160 |
| Re-Impact (4 pound) [inch-pound] | | 160 | 160 | 160 | 160 |
| Erichsen [mm] | | 8.2 | 7.7 | 7.2 | 7.4 |
| Pencil hardness | | 2H | 3H | 3H | 3H |

What is claimed is:

1. A one-component amino resin coating composition, comprising as synthesis components
    (A) at least one amino resin selected from the group consisting of a melamine-formaldehyde resin, a benzoguanamine-formaldehyde resin, and a urea-formaldehyde resin,
    (B) at least one hydroxyl-containing polymer selected from the group consisting of a poly(meth)acrylate polyol (B1), a polyester polyol (B2), a polyetherol (B3), an alkyd resin (B4), and a polycarbonate polyol (B5),
    (C) at least one branched polyester polyol prepared by polycondensation of hexahydrophthalic anhydride, trimethylolpropane,
        optionally at least one diol,
        optionally at least one further triol, and
        optionally at least one further diacid or triacid or a derivative thereof,
    where a molar ratio of acid groups to hydroxyl groups in preparing the polyester polyol is 1:1 to 1:1.95, the polyester polyol contains less than 20% tetraalcohol stoichiometrically relative to hexahydrophthalic anhydride, and
    the polyester polyol is not formed from dihydroxycarboxylic acids,
    (D) optionally at least one chemical crosslinker selected from the group consisting of a blocked polyisocynate, a trisalkylcarbamoyltriazine, an epoxy resin, a carboxyl containing resin, and an amino-containing resin other than the amino resin (A),
    (E) optionally at least one organic solvent,
    (F) optionally at least one catalyst,
    (G) optionally at least one coating additive, and
    (H) optionally at least one filler, dye and/or pigment,
    wherein a ratio of (B) to (C) is greater than 1:1 based on solids,
    a molar ratio of the hydroxyl groups of trimethylolpropane to the hydroxyl groups of the at least one diol is greater than 1:1, and
    the at least one branched polyester polyol (C) has a sum total of acid number according to DIN EN ISO 2114:2000 and hydroxyl number according to DIN 53240-2:2007-11 of 200 to 400 mg KOH/g.

2. The coating composition according to claim 1, wherein the amino resin (A) is a partly etherified melamine-formaldehyde resin which has a molar melamine:formaldehyde:alcohol incorporation ratio of 1:3 to 5.4:1.5 to 4.3.

3. The coating composition according to claim 1, wherein the amino resin (A) is a fully to highly methylolated and fully to highly alkylated melamine-formaldehyde resin which has a molar melamine:formaldehyde:alcohol incorporation ratio of 1:greater than 5.5:greater than 4.5.

4. The coating composition according to claim 1, wherein the hydroxyl-containing polymer (B) is a poly(meth)acrylate polyol (B1) having a number-average molecular weight $M_n$ of 500 to 50 000 D.

5. The coating composition according to claim 1, wherein the polymer (B) and the branched polyester polyol (C) are used in a weight ratio of 1.1:1 to 49:1, based on solids.

6. The coating composition according to claim 1, wherein the polyester polyol (C) has a hydroxyl number of 130 to 280 mg KOH/g based on solids and/or the polyester polyol (C) has an acid number of 8 to 110, according to DIN EN ISO 2114:2000, based on solids.

7. The coating composition according to claim 1, wherein the polyester polyol (C) is prepared exclusively from hexahydrophthalic anhydride and trimethylolpropane in a molar mixing ratio of acid groups to hydroxyl groups of 1:1.1 to 1:1.6.

8. The coating composition according to claim 1, wherein the polyester polyol (C) is prepared by not using, apart from hexahydrophthalic anhydride, any further diacid or triacid or a derivative thereof.

9. The coating composition according to claim 1, wherein the polyester polyol (C) is formed exclusively from hexahydrophthalic anhydride, trimethylolpropane, and at least one dial of an isomer or an isomer mixture of tricyclodecanedimethanol, tetrahydro-2,5-bis(hydroxymethyl)furan, 1,6-hexanediol, neopentyl glycol, and 2-butyl-2-ethyl-1,3-propanediol.

10. The coating composition according to claim 1, wherein the polyester polyol (C) is tin-free and/or is prepared uncatalyzed or with a catalyst comprising zinc, titanium, zirconium, or bismuth, or with another catalyst not comprising tin, and/or wherein the polyester polyol (C) is prepared in the absence of solvent.

11. The coating composition according to claim 1, wherein the polyester polyol (C) has a number-average molecular weight Mn of 500 to 4000 g/mol and/or has a polydispersity of less than or equal to 5.

12. The coating composition according to claim 1, wherein the polyester polyol (C) has a glass transition temperature of −20 to 50° C.

13. The coating composition according to claim 1, wherein the polyester polyol (C) is prepared in a one-stage procedure.

14. The coating composition according to claim 1, which comprises the synthesis components in the following amounts:

(A) 100 parts by weight of the amino resins, based on solid fraction;
(B) from 45 to 882 parts by weight of the hydroxyl-containing polymer, in each case based on solid fractions;
(C) from 2 to 450 parts by weight of the branched polyester polyol, in each case based on solid fractions;
(D) optionally the chemical crosslinker;
(E) from 0 to 80 wt % of the organic solvent, based on a sum total of the components (A) to (G);
(F) from 0 to 10 parts by weight of the catalyst, based on the amino resin (A) used (solid on solid);
(G) optionally the coating additive; and
(H) optionally the filler, dye and/or pigment.

15. A method for coating a substrate, the method comprising:
mixing an amino resin (A), a polymer (B), and a polyester polyol (C), optionally a chemical crosslinker (D), optionally at least one organic solvent (E), optionally at least one catalyst (F), optionally at least one coating additive (G), and optionally at least one filler, dye, and/or pigment (H), to obtain a mixture, and
subsequently applying the mixture to the substrate,
wherein
the amino resin (A) is at least one selected from the group consisting of a melamine-formaldehyde resin, a benzoguanamine-formaldehyde resin, and a urea-formaldehyde resin,
the polymer (B) is at least one hydroxyl-containing polymer selected from the group consisting of a poly(meth)acrylate polyol (B1), a polyester polyol (B2), a polyetherol (B3), an alkyd resin (B4), and a polycarbonate polyol (B5),
the polyester polyol (C) is at least one branched polyester polyol prepared by polycondensation of
hexahydrophthalic anhydride,
trimethylolpropane,
optionally at least one diol,
optionally at least one further triol, and
optionally at least one further diacid or triacid or a derivative thereof,
where a molar ratio of acid groups to hydroxyl groups in preparing the polyester polyol is 1:1 to 1:1.95, the polyester polyol contains less than 20% tetraalcohol stoichiometrically relative to hexahydrophthalic anhydride, and the polyester polyol is not formed from dihydroxycarboxylic acids,
the chemical crosslinker (D) is at least one selected from the group consisting of a blocked polyisocynate, a trisalkylcarbamoyltriazine, an epoxy resin, a carboxyl-containing resin, and an amino-containing resin other than the amino resin (A),
a molar ratio of the hydroxyl groups of trimethylolpropane to the hydroxyl groups of the at least one diol is greater than 1:1, and
the polyester polyol (C) has a sum total of acid number according to DIN EN ISO 2114:2000 and hydroxyl number according to DIN 53240-2:2007-11 of 200 to 400 mg KOH/a.

16. A method for coating, comprising:
applying the coating composition according to claim 1 to a part of a building, a vehicle, an aircraft, a can, a coil, or a decorative coating system.

17. A method for coating a substrate, the method comprising:
applying the coating composition according to claim 1 to the substrate, which is wood, wood veneer, paper, paperboard, cardboard, textile, film, leather, nonwoven, a plastics surface, glass, ceramic, a metal, or a mineral building material,
wherein the substrate is precoated or pretreated.

18. A substrate, coated with the coating composition according to claim 1.

* * * * *

UNITED STATES PATENT AND TRADEMARK OFFICE
CERTIFICATE OF CORRECTION

PATENT NO. : 10,472,539 B2
APPLICATION NO. : 15/515051
DATED : November 12, 2019
INVENTOR(S) : Harald Schaefer et al.

Page 1 of 1

It is certified that error appears in the above-identified patent and that said Letters Patent is hereby corrected as shown below:

In the Specification

Column 10, Line 13, "cydododecyl" should read -- cyclododecyl --;

Column 10, Line 30, "cydododecyl" should read -- cyclododecyl --;

Column 21, Line 28, "Al/Zn" should read -- Al/Zn --;

Column 31, Line 41, "(23±2°)°" should read -- (23±2)° --;

In the Claims

Column 31, Line 63, Claim 1, "carboxyl" should read -- carboxyl- --;

Column 32, Line 45, Claim 9, "dial" should read -- diol --;

Column 34, Line 22, Claim 15, "KOH/a." should read -- KOH/g. --.

Signed and Sealed this
Seventh Day of July, 2020

Andrei Iancu
*Director of the United States Patent and Trademark Office*